(12) United States Patent
Tsuyoshi et al.

(10) Patent No.: US 8,619,527 B2
(45) Date of Patent: Dec. 31, 2013

(54) OPTICAL DISK DEVICE, OPTICAL DISK CONTROL METHOD, AND INTEGRATED CIRCUIT

(75) Inventors: Nakasendo Tsuyoshi, Osaka (JP); Yamaoka Masaru, Osaka (JP); Takagi Yuji, Osaka (JP); Usui Makoto, Osaka (JP)

(73) Assignee: Panasonic Corporation, Osaka (JP)

( * ) Notice: Subject to any disclaimer, the term of this patent is extended or adjusted under 35 U.S.C. 154(b) by 77 days.

(21) Appl. No.: 13/202,434

(22) PCT Filed: Dec. 17, 2010

(86) PCT No.: PCT/JP2010/007341
§ 371 (c)(1),
(2), (4) Date: Aug. 19, 2011

(87) PCT Pub. No.: WO2011/077684
PCT Pub. Date: Jun. 30, 2011

(65) Prior Publication Data
US 2011/0299371 A1    Dec. 8, 2011

(30) Foreign Application Priority Data

Dec. 22, 2009  (JP) ................................ 2009-291090

(51) Int. Cl.
*G11B 7/00*        (2006.01)

(52) U.S. Cl.
USPC ........................ 369/47.5; 369/47.52; 369/189

(58) Field of Classification Search
USPC ............ 369/44.11, 47.43, 47.5, 47.51, 47.52, 369/189, 267
See application file for complete search history.

(56) References Cited

U.S. PATENT DOCUMENTS

| | | | | |
|---|---|---|---|---|
| 5,132,153 A | * | 7/1992 | Hirose et al. | 428/64.9 |
| 5,577,021 A | * | 11/1996 | Nakatani et al. | 369/275.2 |
| 5,949,751 A | * | 9/1999 | Horikawa et al. | 369/275.2 |
| 5,952,073 A | * | 9/1999 | Hurditch et al. | 428/64.1 |
| 5,976,688 A | * | 11/1999 | Kawase et al. | 428/332 |
| 6,052,465 A | | 4/2000 | Gotoh et al. | |
| 6,538,961 B2 | | 3/2003 | Kobayashi et al. | |
| 6,788,635 B1 | | 9/2004 | Aratani et al. | |

(Continued)

FOREIGN PATENT DOCUMENTS

| | | |
|---|---|---|
| JP | 7-14166 | 1/1995 |
| JP | 7-21585 | 1/1995 |

(Continued)

*Primary Examiner* — Thomas Alunkal
(74) *Attorney, Agent, or Firm* — Wenderoth, Lind & Ponack, L.L.P.

(57) ABSTRACT

To provide an optical disk device, an optical disk control method and an integrated circuit, which are capable of writing a recordable mark by changing the reflectance ratio of a reflective film formed on concave-convex pits without using an industrial special device or a high-power laser light source. A data reproduction controller (103) sets a first rotation speed in a disk rotation speed switching unit (108) and a first laser power in a laser power switching unit (107) when reproducing the concave-convex pits. When writing the recordable mark, a mark recording controller (104) sets in the disk rotation speed switching unit (108) a second rotation speed that is slower than the first rotation speed and the lowest rotation speed at which the concave-convex pits can be reproduced, and sets a second laser power greater than the first laser power in the laser power switching unit (107) in accordance with the emission timing.

32 Claims, 23 Drawing Sheets

(56) References Cited

U.S. PATENT DOCUMENTS

| | | |
|---|---|---|
| 6,852,383 B2 | 2/2005 | Sako et al. |
| 7,154,824 B2 | 12/2006 | Aoyama et al. |
| 7,221,637 B2 * | 5/2007 | Arioka et al. ............... 369/59.25 |
| 7,362,671 B2 | 4/2008 | Sako et al. |
| 7,564,756 B2 | 7/2009 | Akiyama |
| 7,580,335 B2 | 8/2009 | Fujita et al. |
| 2002/0119279 A1 * | 8/2002 | Ogawa ......................... 428/64.4 |
| 2003/0054128 A1 | 3/2003 | Sako et al. |
| 2003/0059712 A1 * | 3/2003 | Yashiro .................... 430/270.16 |
| 2004/0027980 A1 | 2/2004 | Sako et al. |
| 2004/0240326 A1 | 12/2004 | Aoyama et al. |
| 2005/0128905 A1 | 6/2005 | Sako et al. |
| 2006/0098559 A1 * | 5/2006 | Hino et al. ................. 369/275.1 |
| 2009/0196140 A1 | 8/2009 | Yamaoka et al. |

FOREIGN PATENT DOCUMENTS

| | | |
|---|---|---|
| JP | 3089599 | 7/2000 |
| JP | 3454410 | 7/2003 |
| JP | 4211395 | 11/2008 |
| WO | 03/017274 | 2/2003 |
| WO | 03/060900 | 7/2003 |
| WO | 2007/139077 | 12/2007 |

* cited by examiner

OPTICAL DISK DEVICE, OPTICAL DISK CONTROL METHOD, AND INTEGRATED CIRCUIT

TECHNICAL FIELD

The present invention relates to an optical disk device, an optical disk control method and an integrated circuit for writing unique recordable marks onto an optical disk having main information recorded thereon by concave-convex pits, and for detecting the written recordable marks.

BACKGROUND ART

Optical disks such as DVD-ROMs and BD-ROMs have been widely used as media for recording digital content data. As to a DVD-ROM, a single-layer disk has a recording capacity of 4.7 GB (gigabyte), whereas a dual-layer disk with two recording layers has a recording capacity of 8.5 GB. As to a BD-ROM, a single-layer disk has a recording capacity of 25 GB and a dual-layer disk has a recording capacity of 50 GB. Therefore, the optical disks are becoming more and more popular as distribution media of digital data. Especially the BD-ROMs on which a large amount of data can be recorded are utilized as optical disks for readily distributing high-definition image content data.

As the recording capacity of an optical disk increases, the volume of an information content saved in a single optical disk and the value per optical disk have been heightened. This has brought about growing demand for distinguishing and managing, one by one, optical disks in which information contents are recorded by concave-convex pits.

Generally, however, one of the features of such optical disks that have information contents recorded thereon by concave-convex pits is that many copies of the optical disks can be produced at once from a master disk called stamper. However, due to such a feature of producing a number of copies from the master disk, the optical disks that are produced from this master disk have the completely same pit shape. It is, therefore, impossible to distinguish these optical disks from one another.

As a technology for identifying each of the optical disks produced by the stamper, there is disclosed a technology for recording an ID unique to a disk by providing a special area called "burst cutting area (BCA)" and recording a radially long mark in the form of a barcode by using a high-power laser called "YAG laser" (see Patent Literature 1, for example).

There is also disclosed a technology for performing pulse recording with very short channel clock unit width in the vicinity of a pit or land of a predetermined length or more on an optical disk and locally changing the reflectance ratio, to record disk identification information (see Patent Literature 2, for example).

Furthermore, there is disclosed a technology in which areas on an optical disk are divided into a data area and an identification area, wherein a plurality of pits and a plurality of lands are repeatedly recorded in the identification area to obtain predetermined modulated patterns, and the repeated pits and lands are irradiated with a gas laser beam to change a reflective film of the optical disk, from which a reproduction signal is detected (see Patent Literature 3, for example).

In addition, there is disclosed a technology in which the reflectance ratio of a reflective film is changed in order to record sub information, by radiating a laser beam continuously or intermittently onto concave-convex marks (concave-convex pits) with the integral multiple of the length of channel bits along the concave-convex marks, the concave-convex marks having recorded thereon randomly arrayed information contents that are main information (see Patent Literature 4, for example).

However, in the invention disclosed in Patent Literature 1, the paragraph 0035 describes that the reflective film of the optical disk is melted into a slit, which requires great energy in order to record the marks. Therefore, a relatively large and high-power industrial pulse laser such as YAG laser needs to be used for recording the marks. In other words, the recording device described in Patent Literature 1 is a large-scale recording device that is installed in a factory, and an optical disk drive for a general personal computer mounted only with a relatively low-power semiconductor laser light source cannot melt an aluminum reflective film to record an ID for identifying a disk.

In the invention disclosed in Patent Literature 2, the paragraph 0017 describes that, when recording the marks, a special device that turns out to be a finished device needs to be used in a factory to record the disk identification information in complete synchronization in units of channel bits of a disk reproduction signal. The pulse width for recording the disk identification information needs to be sufficiently shorter than a bit length in order not to degrade the quality of a reproduction signal of the information that are originally written in the pits. In the example described in Patent Literature 2, the recording pulse width corresponds to 1 channel bit. Normally when recording drastic pulses on highly precise positions on a reflective film having relatively good thermal conductivity, the pulse being detected stably by a reproducing device, a laser drive circuit that is as precise as or more precise than a recording optical disk device and a laser light source for outputting relatively large laser power are required.

In the invention disclosed in Patent Literature 3, the paragraph 0027 describes that an argon laser, He—Cd laser, or other type of gas laser is required as a laser source, which means that a special recording device managed in a factory is used, as with Patent Literature 1 and Patent Literature 2. According to the invention disclosed in Patent Literature 3, a pattern with a plurality of predetermined pits and lands needs to be prepared in a specific area of an optical disk. FIGS. 11A and 11B of Patent Literature 3 illustrate repeated patterns of pits and lands of a length corresponding to three channel bits (3T). Moreover, Patent Literature 3 does not specifically disclose what kind of physical properties are changed and how the reproducing device detects the reproduction signal when the reflective film is irradiated with a gas laser and consequently the properties of the reflective film are changed.

In the invention disclosed in Patent Literature 4, concave-convex pits on a certain area are irradiated with a laser beam to change the reflectance ratio of the optical disk somewhat extensively. The invention disclosed in Patent Literature 4 has the characteristics of easily obtaining detection sensitivity even when the amount of change in the reflectance ratio is low, because the reflectance ratio needs to be changed somewhat extensively. Patent Literature 4 describes that the marks are recorded by radiating a laser beam onto the concave-convex pits but does not describe a specific configuration of a recording device.

CITATION LIST

Patent Literature

Patent Literature 1: Japanese Patent No. 3089599
Patent Literature 2: Japanese Patent No. 3454410
Patent Literature 3: Japanese Patent No. 4211395
Patent Literature 4: WO 2007/139077

SUMMARY OF INVENTION

The present invention was contrived in order to solve the problems described above, and an object thereof is to provide an optical disk device, optical disk control method and integrated circuit, which are capable of writing a recordable mark onto an optical disk having main information recorded thereon by concave-convex pits, by changing the reflectance ratio of a reflective film formed on the concave-convex pits, by using a relatively inexpensive low-power laser light source, instead of using an industrial special device or a high-power laser light source.

An optical disk device according to one aspect of the present invention is an optical disk device for writing a recordable mark onto an optical disk having main information recorded thereon by concave-convex pits, by changing a reflectance ratio of a reflective film formed on the concave-convex pits, the optical disk device having: an optical pickup; an RF signal processor that acquires an RF signal based on an output from the optical pickup; a reference position detector that demodulates the RF signal and detects a reference position signal; a rotation speed controller that switches a rotation speed of the optical disk between at least two rotation speeds; an emission timing generation unit that generates, according to the reference position signal, an emission timing at which a laser beam is radiated from the optical pickup at a predetermined position; a laser power controller that increases a laser power of the laser beam that is radiated from the optical pickup at the emission timing; a reflectance ratio change amount detector that detects, from the RF signal, an amount of change in a reflectance ratio of reflected light reflected from the optical disk; a concave-convex pit reproduction controller that sets a first rotation speed in the rotation speed controller and a first laser power in the laser power controller when reproducing the concave-convex pits formed on the optical disk; and a recordable mark recording controller that, when writing the recordable mark onto the optical disk, sets in the rotation speed controller a second rotation speed that is slower than the first rotation speed and a lowest rotation speed at which the concave-convex pits can be reproduced, and sets a second laser power greater than the first laser power in the laser power controller according to the emission timing.

According to this configuration, the RF signal is acquired based on an output from the optical pickup. The RF signal is demodulated, and the reference position signal is detected. The rotation speed controller switches the rotation speed of the optical disk between at least two rotation speeds. According to the reference position signal, the emission timing generation unit generates the emission timing at which the laser beam is radiated from the optical pickup at a predetermined position. The laser power controller increases the laser power of the laser beam radiated from the optical pickup at the emission timing. The reflectance ratio change amount detector detects, from the RF signal, the amount of change in the reflectance ratio of the reflected light reflected from the optical disk. When reproducing the concave-convex pits formed on the optical disk, the first rotation speed is set in the rotation speed controller, and the first laser power is set in the laser power controller. When writing the recordable mark onto the optical disk, the second rotation speed, which is slower than the first rotation speed and the lowest rotation speed at which the concave-convex pits can be reproduced, is set in the rotation speed controller. According to the emission timing, the second laser power greater than the first laser power is set in the laser power controller.

According to the present invention, a recordable mark can be written onto an optical disk having main information recorded thereon by concave-convex pits, by changing the reflectance ratio of a reflective film formed on the concave-convex pits, by using a relatively inexpensive low-power laser light source, instead of using an industrial special device or high-power laser light source.

The object, features and advantages of the present invention will become clear from the following detailed descriptions and the accompanying drawings.

DESCRIPTION OF EMBODIMENTS

Embodiments of the present invention are described hereinafter with reference to the drawings accordingly. Note that the following embodiments are merely examples embodying the present invention and are not to limit the technical scope of the present invention.

Embodiment 1

Figure 1:
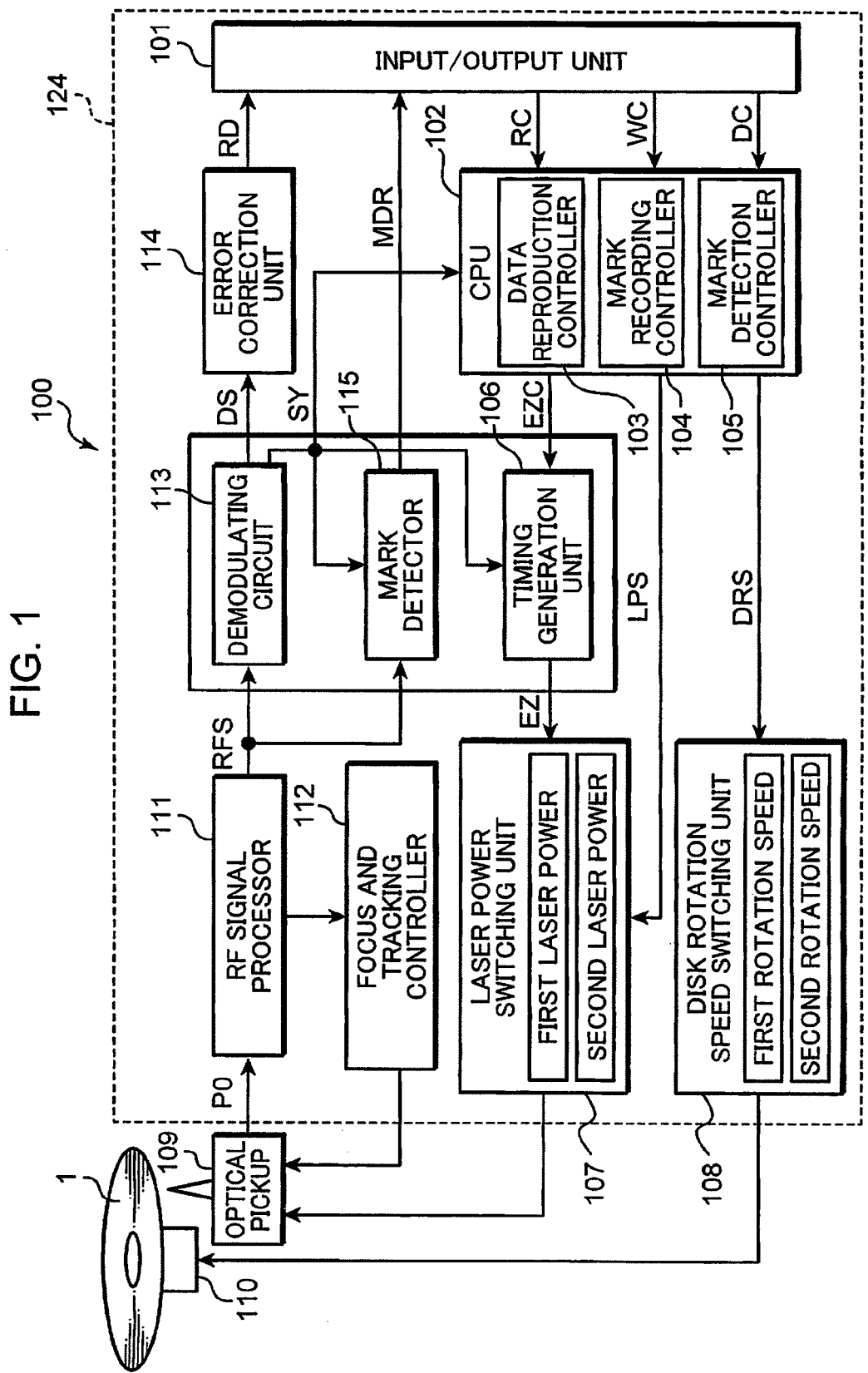
FIG. 1 is a block diagram showing a configuration of an optical disk device according to Embodiment 1 of the present invention.

FIG. 1 is a block diagram showing a configuration of an optical disk device according to Embodiment 1 of the present invention. In FIG. 1, an optical disk device 100 has an input/output unit 101, CPU (Central Processing Unit) 102, timing generation unit 106, laser power switching unit 107, disk rotation speed switching unit 108, optical pickup 109, disk motor 110, RF signal processor 111, focus and tracking controller 112, demodulating circuit 113, error correction unit 114, and mark detector 115. The blocks within the dashed line shown in FIG. 1 are mounted in the form of a semiconductor integrated circuit 124 in a single chip.

The optical disk device 100 writes a recordable mark onto an optical disk 1 having main information recorded thereon by concave-convex pits, by changing the reflectance ratio of a reflective film formed on the concave-convex pits. The optical disk device 100 reproduces the main information recorded by the concave-convex pits, and also reproduces the written recordable mark.

The disk motor 110 rotates the optical disk 1 at constant speed. The optical pickup 109 reads the main information recorded by the concave-convex pits, from the optical disk 1. The optical pickup 109 radiates a laser beam onto the optical disk 1, receives reflected light from the optical disk 1, and outputs an optical pickup output signal P0.

The RF signal processor 111 acquires an RF signal RFS based on the optical pickup output signal P0 from the optical pickup 109. The focus and tracking controller 112 drives the optical pickup 109 in a focus direction and tracking direction such that the light beam radiated by the optical pickup 109 accurately traces the concave-convex pits on the optical disk 1. When reproducing information contents configured by concave-convex pits, a phase difference detection method is normally used as a tracking control method. In other words, the focus and tracking controller 112 performs tracking control using the phase difference detection method. The demodulating circuit 113 demodulates the RF signal RFS and outputs a demodulated digital signal DS. The demodulating circuit 113 also detects a synchronization code included in the RF signal RFS, to generate a reference position signal SY.

The error correction unit 114 corrects a random error and burst error that are included in the digital signal DS demodulated by the demodulating circuit 113, and transmits thus obtained digital signal DS as a digital reproduction signal RD to the input/output unit 101.

The input/output unit 101 is an interface that allows the optical disk device 100 to receive a reproduction command from, for example, an external personal computer or the like. The input/output unit 101 outputs operational commands related to data reproduction, mark recording and mark detection, which are input from the outside, to the CPU 102. The input/output unit 101 also receives the digital reproduction signal RD obtained as a result of the error correction by the error correction unit 114, and a mark detection result MDR obtained as a result of mark detection by the mark detector 115, and outputs the digital reproduction signal RD and the mark detection result MDR to the outside.

The CPU 102 that controls the entire optical disk device 100 has a data reproduction controller 103, mark recording controller 104, and mark detection controller 105.

The mark detector 115 detects the recordable mark that is recorded by changing the reflectance ratio of the reflective film. From the RF signal RFS, the mark detector 115 detects the amount of change in the reflectance ratio of the reflected light from the optical disk 1. The timing generation unit 106 generates an emission section signal EZ in synchronization with the reference position signal SY received from the demodulating circuit 113, in response to an instruction from the CPU 102. In accordance with the reference position signal SY, the timing generation unit 106 generates an emission timing at which the laser beam is radiated from the optical pickup 109 at a predetermined position.

The laser power switching unit 107 switches laser power. The laser power switching unit 107 increases the laser power of the laser beam radiated from the optical pickup 109 at the emission timing generated by the timing generation unit 106. The disk rotation speed switching unit 108 switches the rotation speed of the optical disk 1. The disk rotation speed switching unit 108 switches the rotation speed of the optical disk 1 between at least two rotation speeds.

The data reproduction controller 103 sets a first rotation speed in the disk rotation speed switching unit 108 and a first laser power in the laser power switching unit 107, when reproducing the concave-convex pits formed on the optical disk 1.

When writing the recordable mark onto the optical disk 1, the mark recording controller 104 sets in the disk rotation speed switching unit 108 a second rotation speed that is slower than the first rotation speed and a lowest rotation speed at which the concave-convex pits can be reproduced, and sets a second laser power greater than the first laser power in the laser power switching unit 107 according to the emission timing.

When detecting the recordable mark formed on the optical disk 1, the mark detection controller 105 performs control to detect the recordable mark based on the amount of change in the reflectance ratio that is detected by the mark detector 115.

Note that, in the present embodiment, the RF signal processor 111 corresponds to an example of the RF signal processor, the demodulating circuit 113 to an example of the reference position detector, the disk rotation speed switching unit 108 to an example of the rotation speed controller, the timing generation unit 106 to an example of the emission timing generation unit, the laser power switching unit 107 to an example of the laser power controller, the mark detector 115 to an example of the reflectance ratio change amount detector, the data reproduction controller 103 to an example of the concave-convex pit reproduction controller, the mark recording controller 104 to an example of the recordable mark recording controller, the mark detection controller 105 to an example of the recordable mark detection controller, and the focus and tracking controller 112 to an example of a tracking controller.

Figure 2:
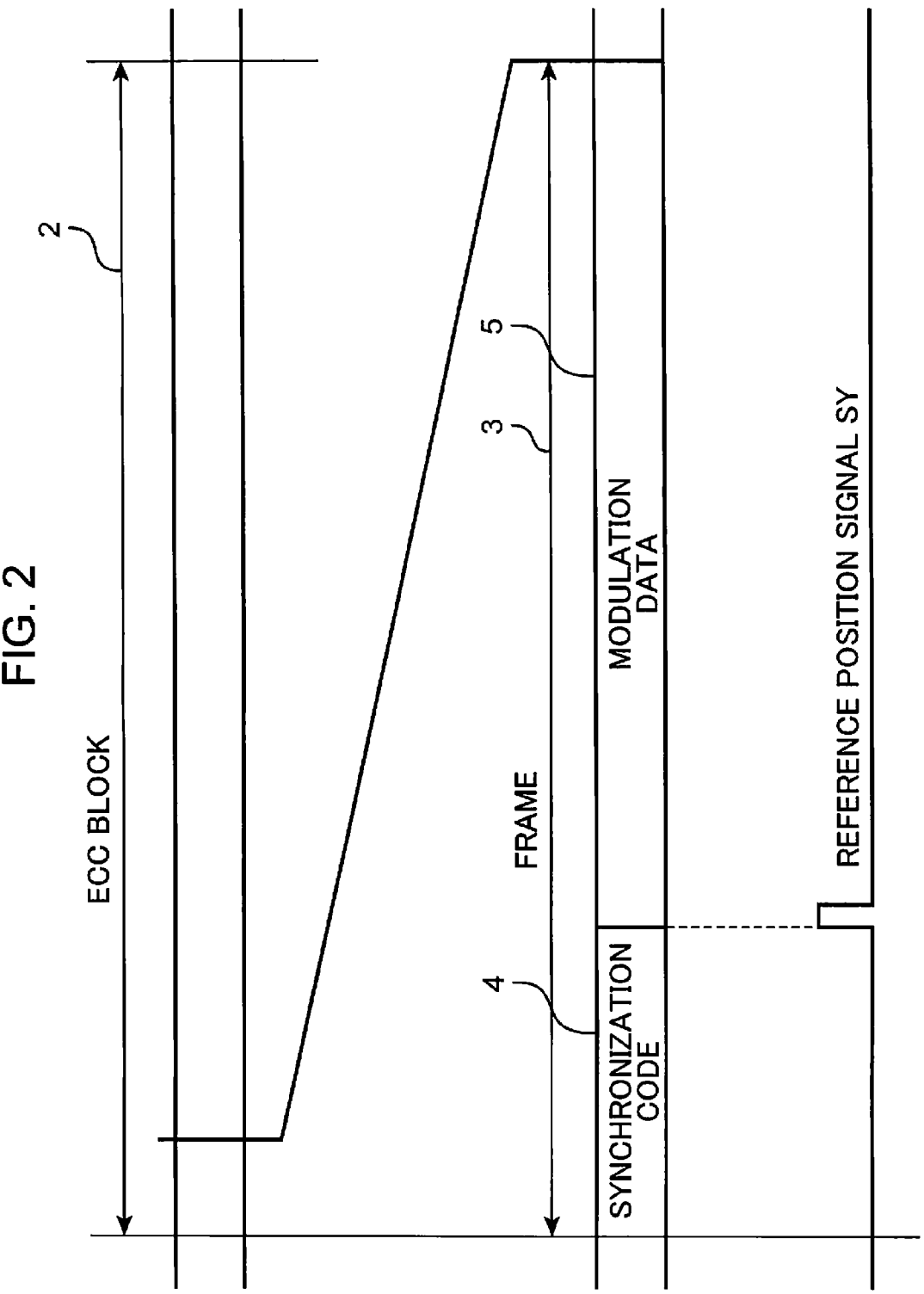
FIG. 2 is a schematic diagram for illustrating a data format of an optical disk used in the optical disk device according to Embodiment 1 of the present invention.

FIG. 2 is a schematic diagram for illustrating a data format of the optical disk used in the optical disk device according to Embodiment 1 of the present invention. In FIG. 2, an ECC (Error Correction Code) block 2 represents a minimum unit by which error correction can be performed on the digital signal DS reproduced from the optical disk 1. A frame 3 represents a minimum unit of modulation data to which the synchronization code is added. Normally, one ECC block is configured by hundreds of frames. Furthermore, the frame 3 is configured by a synchronization code 4 and modulation data 5. The synchronization code 4 is a signal added in order to position the reproduction data on the disk, and unique patterns that do not normally appear in the modulation data are used. The demodulating circuit 113 generates the reference position signal SY by detecting the synchronization code 4.

The demodulating circuit 113, capable of outputting the reference position signal SY continuously, has an address demodulating circuit therein from which the reference position signal SY is output in synchronization with a specific start address.

Figure 3:
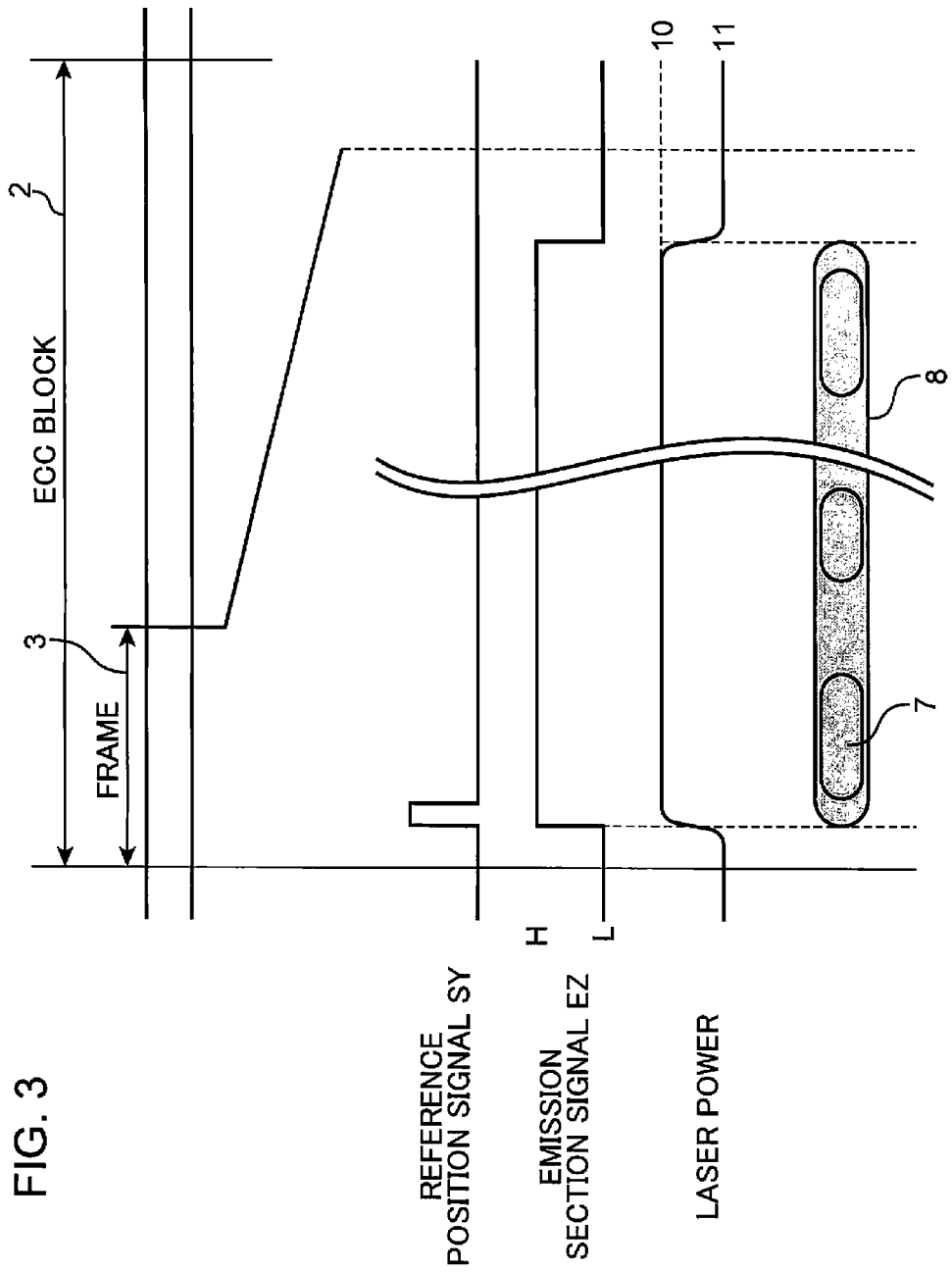
FIG. 3 is a timing chart showing a mark recording operation according to Embodiment 1 of the present invention.

FIG. 3 is a timing chart showing a mark recording operations according to Embodiment 1 of the present invention. The timing generation unit 106 outputs the emission section signal EZ based on the reference position signal SY. When the emission section signal EZ is low, the laser power switching unit 107 causes the laser light source of the optical pickup 109 to emit light with a first laser power level 11. When the emission section signal EZ is high, the laser power switching unit 107 causes the laser light source of the optical pickup 109 to emit light with a second laser power level 10 greater than the first laser power level 11. In a section in which the laser power indicates the second laser power level 10, a recordable mark 8 is formed on a disk board surface along concave-convex pits 7 on the disk board surface.

The recordable mark 8 might not be distinguished from the concave-convex pits 7 in the RF signal RFS unless the recordable mark 8 is recorded in a frequency band different from that of a demodulated signal of the concave-convex pits 7, so that the recordable mark 8 is detected stably. Therefore, the length of the recordable mark 8 is desirably equal to or greater than ten times the shortest pit length of the concave-convex pits 7. In other words, an emission section in which the laser beam is radiated with the second laser power is desirably equal to or greater than ten times the shortest pit length of the concave-convex pits.

When using an inexpensive semiconductor laser light source, the second laser power level 10 cannot be set remarkably high. In terms of the life of the laser light source, the second laser power is preferably equal to or greater than five times and equal to or less than ten times the first laser power.

Operations that are performed by the mark detector 115, the timing generation unit 106, the laser power switching unit 107 and the disk rotation speed switching unit 108 when instructions are received from the CPU 102 are described hereinafter in further detail as the characteristics of Embodiment 1 of the present invention, with reference to the flowcharts of FIGS. 4, 5 and 7, as well as the illustration of FIG. 6.

Figure 4:
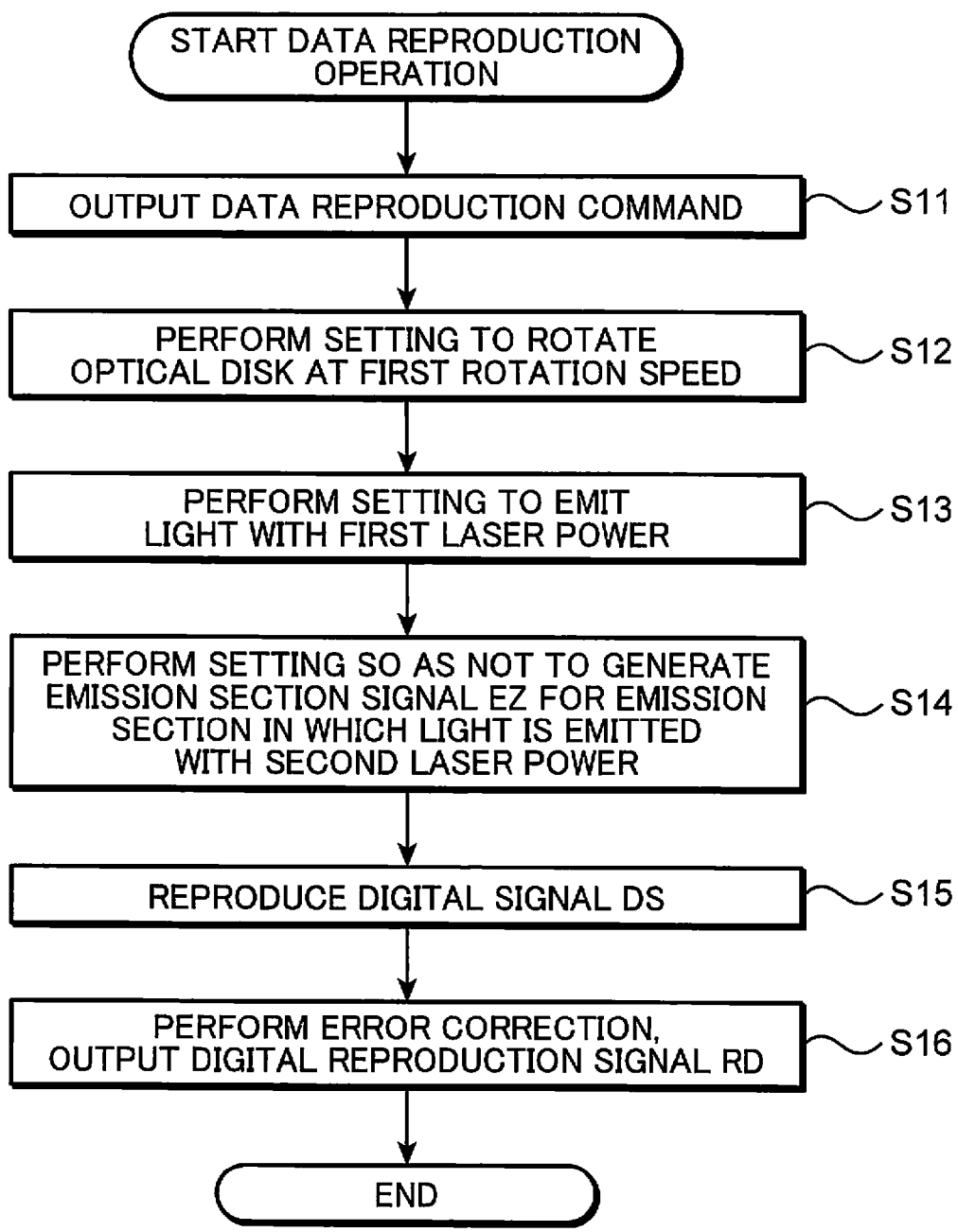
FIG. 4 is a flowchart showing a data reproduction operation for reproducing content data recorded by concave-convex pits.

FIG. 4 is a flowchart showing a data reproduction operation for reproducing content data recorded by the concave-convex pits.

First, the input/output unit 101 outputs a data reproduction command to the data reproduction controller 103 in order to reproduce content data recorded by the concave-convex pit (step S11). The data reproduction controller 103 receives the data reproduction command from the input/output unit 101 and outputs a disk rotation speed setting signal DRS for setting the rotation speed of the optical disk 1, a laser power setting signal LPS for setting the laser power of the laser beam output from the optical pickup 109, and an emission timing setting signal EZC for setting the laser beam emission timing, in order to reproduce the optical disk 1 and read the content data therefrom.

The data reproduction controller 103 then outputs the disk rotation speed setting signal DRS to the disk rotation speed switching unit 108, and sets the disk rotation speed switching unit 108 such that the optical disk 1 is rotated at the first rotation speed by the disk motor 110, which is a rotation speed used when the content data are reproduced (step S12).

Subsequently, the data reproduction controller 103 outputs the laser power setting signal LSP to the laser power switching unit 107, and sets the laser power switching unit 107 such that the laser light source is caused to emit light with the first laser power used when reproducing the content data (step S13).

The data reproduction controller 103 then outputs the emission timing setting signal EZC to the timing generation unit 106, and sets the timing generation unit 106 so as to output the emission section signal EZ in which the laser light source emits light always with the first laser power, instead of the second laser power (step S14).

When the reproduction of the content data from the optical disk 1 is started, the RF signal RFS is input to the demodulating circuit 113 via the optical pickup 109 and the RF signal processor 111. Subsequently, the demodulating circuit 113 demodulates the RF signal RFS and starts reproducing the digital signal DS (step S15). Thereafter, the error correction unit 114 corrects errors in the digital signal DS and outputs the digital reproduction signal RD to the input/output unit 101 (step S16).

Note that, when reproducing the data, the focus control and tracking control by the focus and tracking controller 112 or the position control of the optical pickup 109 are required. These are the functions that general optical disk devices normally have. Thus, the descriptions thereof are omitted herein.

Figure 5:
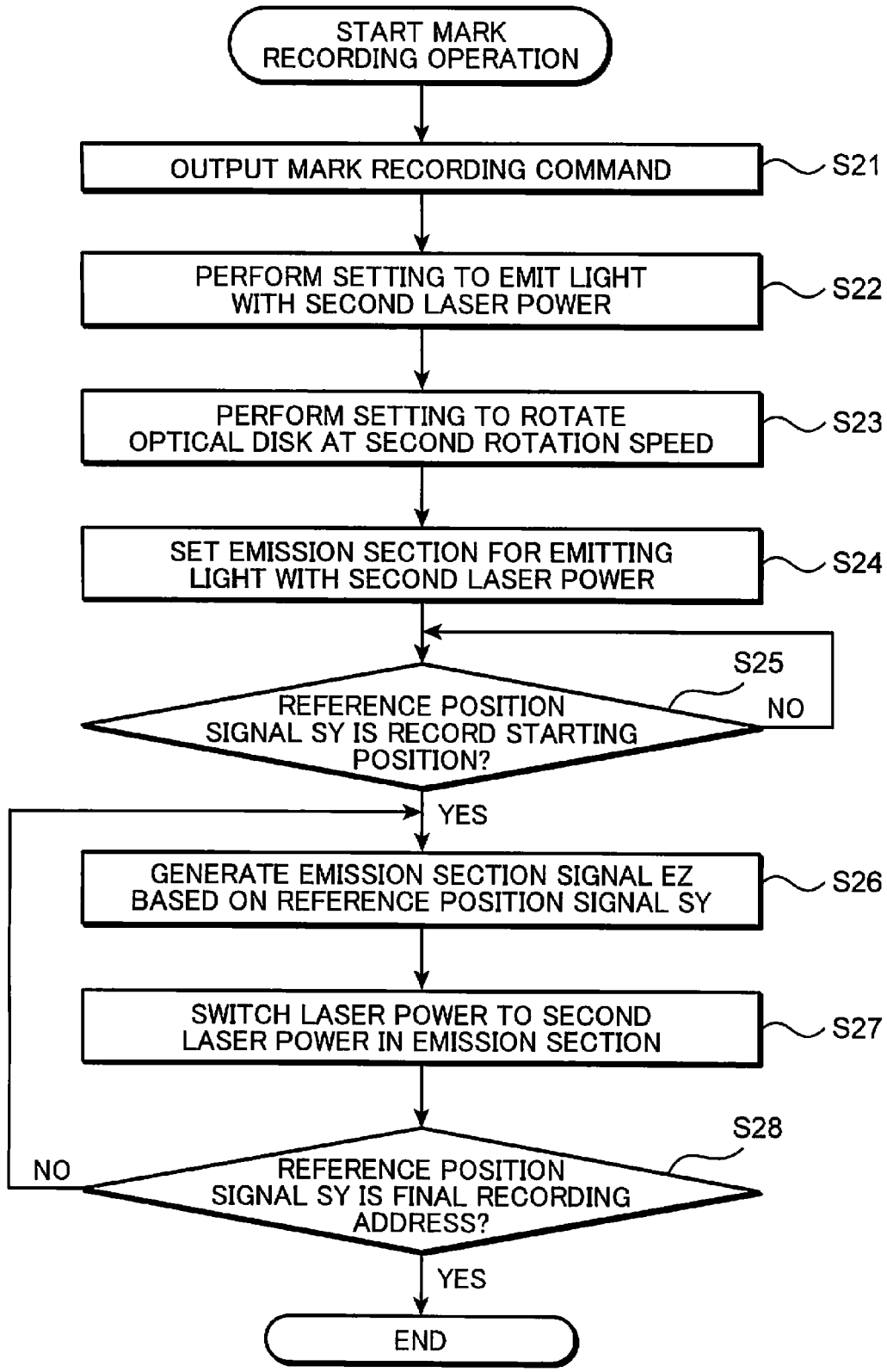
FIG. 5 is a flowchart showing the mark recording operation for recording a recordable mark.

FIG. 5 is a flowchart showing the mark recording operation for recording the recordable mark.

First, the input/output unit 101 outputs a mark recording command for recording the recordable mark, to the mark recording controller 104 (step S21). The mark recording controller 104 receives the mark recording command from the input/output unit 101, and outputs the laser power setting signal LPS for setting the laser power of the laser beam output from the optical pickup 109, the disk rotation speed setting signal DRS for setting the rotation speed of the optical disk 1, and the emission timing setting signal EZC for setting the laser beam emission timing, in order to record the recordable mark.

The mark recording controller 104 then outputs the laser power setting signal LPS to the laser power switching unit 107, and sets the laser power switching unit 107 such that the laser light source is caused to emit light with the second laser power (step S22).

The mark recording controller 104 then outputs the disk rotation speed setting signal DRS to the disk rotation speed switching unit 108, and sets the disk rotation speed switching unit 108 such that the optical disk 1 is rotated at the second rotation speed by the disk motor 110 (step S23).

Subsequently, the mark recording controller 104 outputs the emission timing setting signal EZC to the timing generation unit 106, and sets the timing generation unit 106 so as to output the emission section signal EZ in which the laser light source emits light with the second laser power (step S24). In the example shown in the timing chart of FIG. 3, the mark recording controller 104 sets the emission timing so as to generate a pulse corresponding to a constant section width, after the reference position signal SY.

When a reproduction position on the optical disk reaches the position of the synchronization code, the demodulating circuit 113 outputs the reference position signal SY. The mark recording controller 104 determines whether the reference position signal SY is a recording start position or not (step S25). When it is determined that the reference position signal SY is not the recording start position (NO in step S25), the determination process of step S25 is repeated until the reference position signal SY becomes the recording start position.

When, on the other hand, it is determined that the reference position signal SY is the recording start position (YES in step S25), the timing generation unit 106 generates, based on the reference position signal SY, the emission section signal EZ indicating the section in which the laser beam is emitted (step S26). In the emission section indicated by the emission section signal EZ, the laser power switching unit 107 switches the emission power of the laser light source from the first laser power to the second laser power (step S27).

Next, the mark recording controller 104 determines whether the reference position signal SY is a final recording address or not (step S28). When it is determined that the reference position signal SY is not the final recording address (NO in step S28), the process returns to step S26. When, on the other hand, it is determined that the reference position signal SY is the final recording address (YES in step S28), the mark recording operation is ended. The operations from step S26 to step S28 described above are repeated until the reference position signal SY becomes the final recording address, and then the recordable mark is recorded.

The above describes that when the reproduction position on the optical disk becomes a specific position, the reference position signal SY is output. However, the reference position signal SY can be always output at the position of the synchronization code, and address information can be output simultaneously with the reference position signal SY from the demodulating circuit 113 to the timing generation unit 106, so that the timing generation unit 106 can determine the specific position based on the address information.

Figure 6:
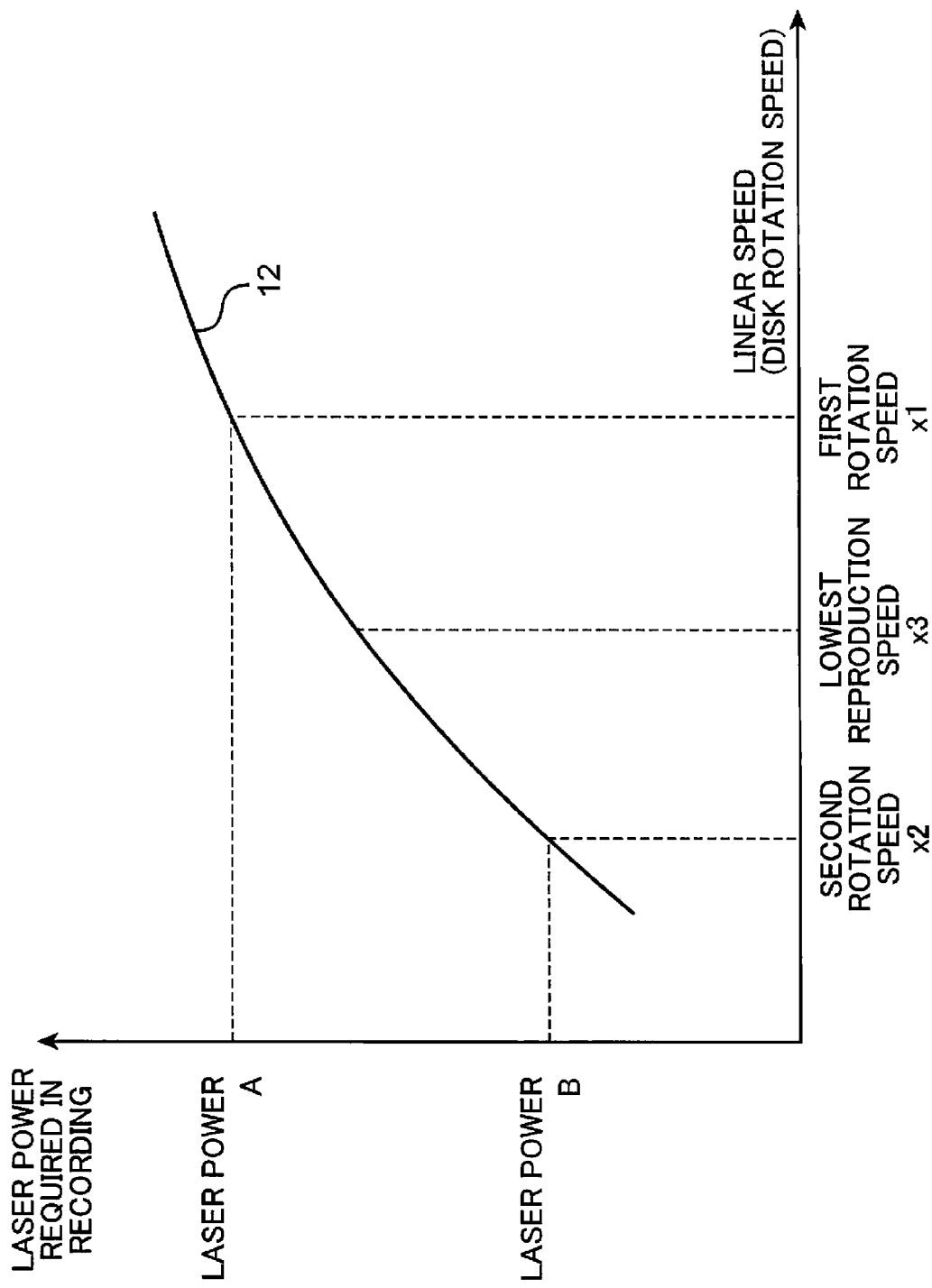
FIG. 6 is a diagram showing a relationship between rotation speeds and laser powers required in recording the recordable mark in Embodiment 1 of the present invention.

FIG. 6 is a diagram showing a relationship between the rotation speeds and the laser powers required in recording the recordable mark in Embodiment 1 of the present invention. When recording the recordable mark onto the optical disk 1 on which the concave-convex pits are formed, constant heat energy is applied to the reflective film by irradiating it with the laser beam, to cause physical and optical changes on the reflective film. The higher the linear speed or the rotation speed of the optical disk 1, the lower the amount of heat applied to the reflective film per unit length. Therefore, the changes cannot occur on the reflective film unless the laser beam is radiated from the optical pickup 109 using intense laser power.

Suppose that the physical and optical changes are produced on the reflective film by using the first rotation speed x1 and laser power A, in a power curve 12 shown in FIG. 6. Here, a laser power B represents a laser power that is required in producing the same physical and optical changes to the reflective film at second rotation speed x2 lower than the first rotation speed x1, the physical and optical changes being the same as those obtained when the optical disk 1 is rotated at the first rotation speed x1. The laser power B is lower than the laser power A.

The second rotation speed is preferably equal to or less than ½ the lowest rotation speed at which the concave-convex pits can be reproduced. In Embodiment 1 of the present invention, the physical and optical changes can be produced on the reflective film using sufficiently low laser power, by setting the second rotation speed x2 at, for example, a rotation speed that is equal to or less than ½ the lowest rotation speed x3 required in reproducing the content data of a normal optical disk device.

In addition, the second rotation speed is preferably equal to or less than ¹⁄₁₀ of the first rotation speed. An optical disk device is generally designed so as to be able to reproduce content data at high speeds, but the second rotation speed is set at a rotation speed that is equal to or less than ¹⁄₁₀ of the first rotation speed so that the physical and optical changes can be produced on the reflective film using sufficiently low laser power.

Figure 7:
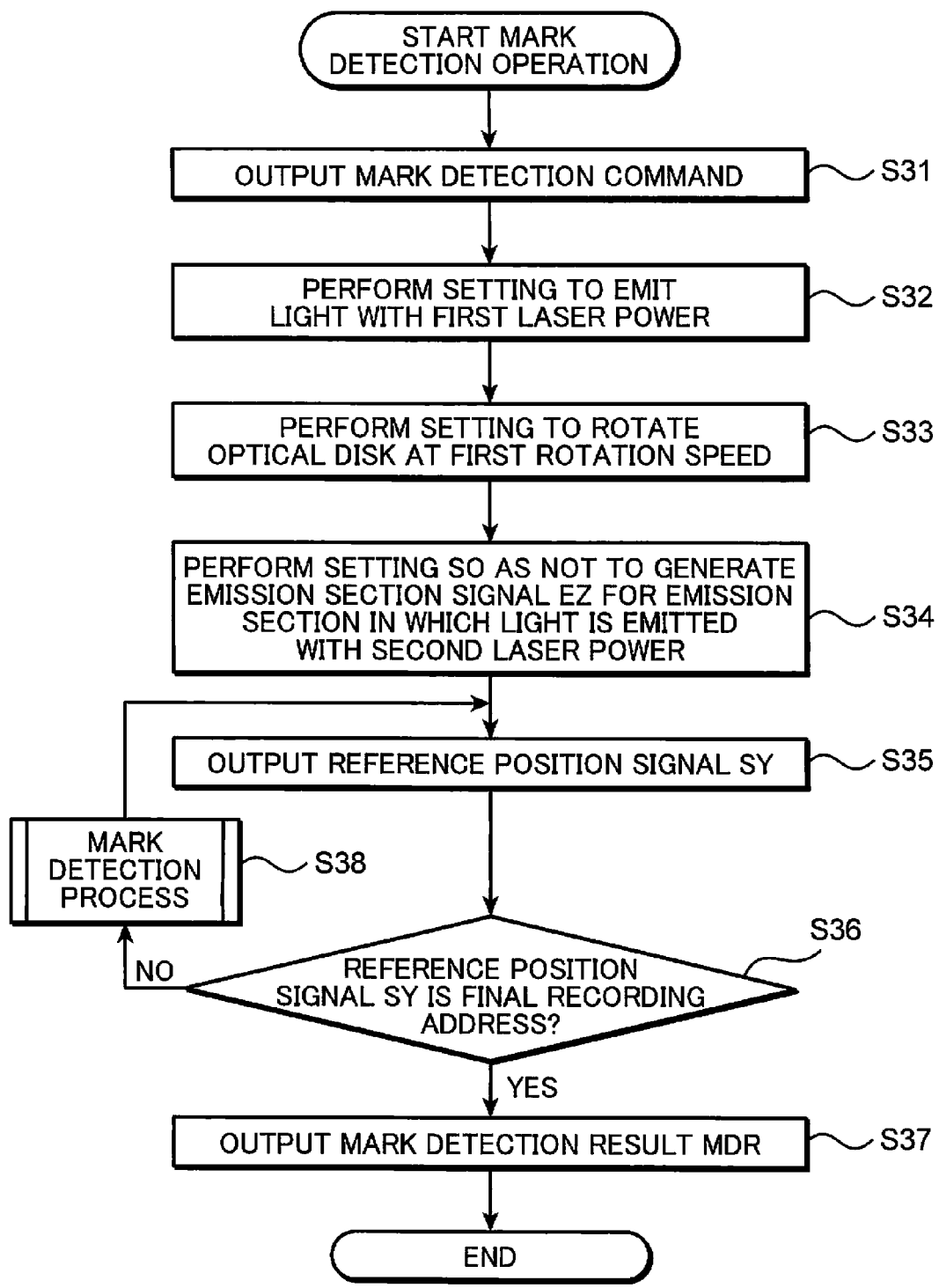
FIG. 7 is a flowchart showing a mark detection operation for detecting the recordable mark recorded on the optical disk.

FIG. 7 is a flowchart showing a mark detection operation for detecting the recordable mark recorded on the optical disk.

First, the input/output unit 101 outputs a mark detection command for detecting the recordable mark recorded on the optical disk 1, to the mark detection controller 105 (step S31). The mark detection controller 105 receives the mark detection command from the input/output unit 101, and outputs the emission timing setting signal EZC for setting the laser beam emission timing, the laser power setting signal LPS for setting the laser power of the laser beam output from the optical pickup 109, and the disk rotation speed setting signal DRS for setting the rotation speed of the optical disk 1, in order to detect the recordable mark recorded on the optical disk 1.

The mark detection controller 105 then outputs the laser power setting signal LPS to the laser power switching unit 107, and sets the laser power switching unit 107 such that the laser light source is caused to emit light with the first laser power used when reproducing the content data (step S32).

Subsequently, the mark detection controller 105 outputs the disk rotation speed setting signal DRS to the disk rotation speed switching unit 108, and sets the disk rotation speed switching unit 108 so that the optical disk 1 is rotated at the first rotation speed by the disk motor 110 (step S33).

The mark detection controller 105, thereafter, outputs the emission timing setting signal EZC to the timing generation unit 106, and sets the timing generation unit 106 so as to output the emission section signal EZ in which the laser light source emits light with the first laser power, instead of the second laser power.

When the reproduction of the content data from the optical disk 1 is started, the RF signal RFS is input to the demodulating circuit 113 via the optical pickup 109 and the RF signal processor 111. Subsequently, the demodulating circuit 113 demodulates the RF signal RFS and outputs the reference position signal SY (step S35).

Next, the mark detector 115 determines whether the reference position signal SY is the final recording address or not (step S36). When it is determined that the reference position signal SY is the final recording address (YES in step S36), the mark detector 115 outputs the mark detection result MDR to the input/output unit 101, whereby the mark detection operation is ended (step S37). However, when it is determined that the reference position signal SY has not yet reached the final recording address, or that the reference position signal SY is not the final recording address (NO in step S36), the mark detector 115 executes a mark detection process described hereinafter (step S38).

In the present embodiment, the rotation speed of the disk is the first rotation speed when the mark detection operation is performed. However, the recordable mark can be detected when the disk is rotated at the second rotation speed as well. Generally, switching between the rotation speeds of the disk motor requires response time, which has an impact on the amount of time required in the entire data reproduction operation, mark recording operation and mark detection operation. For this reason, it is preferred that the rotation speeds be determined in view of the order of the content data reproduction operation, the recordable mark recording operation, and the recordable mark reproduction operation, so as to obtain the shortest total processing time.

Figure 8:
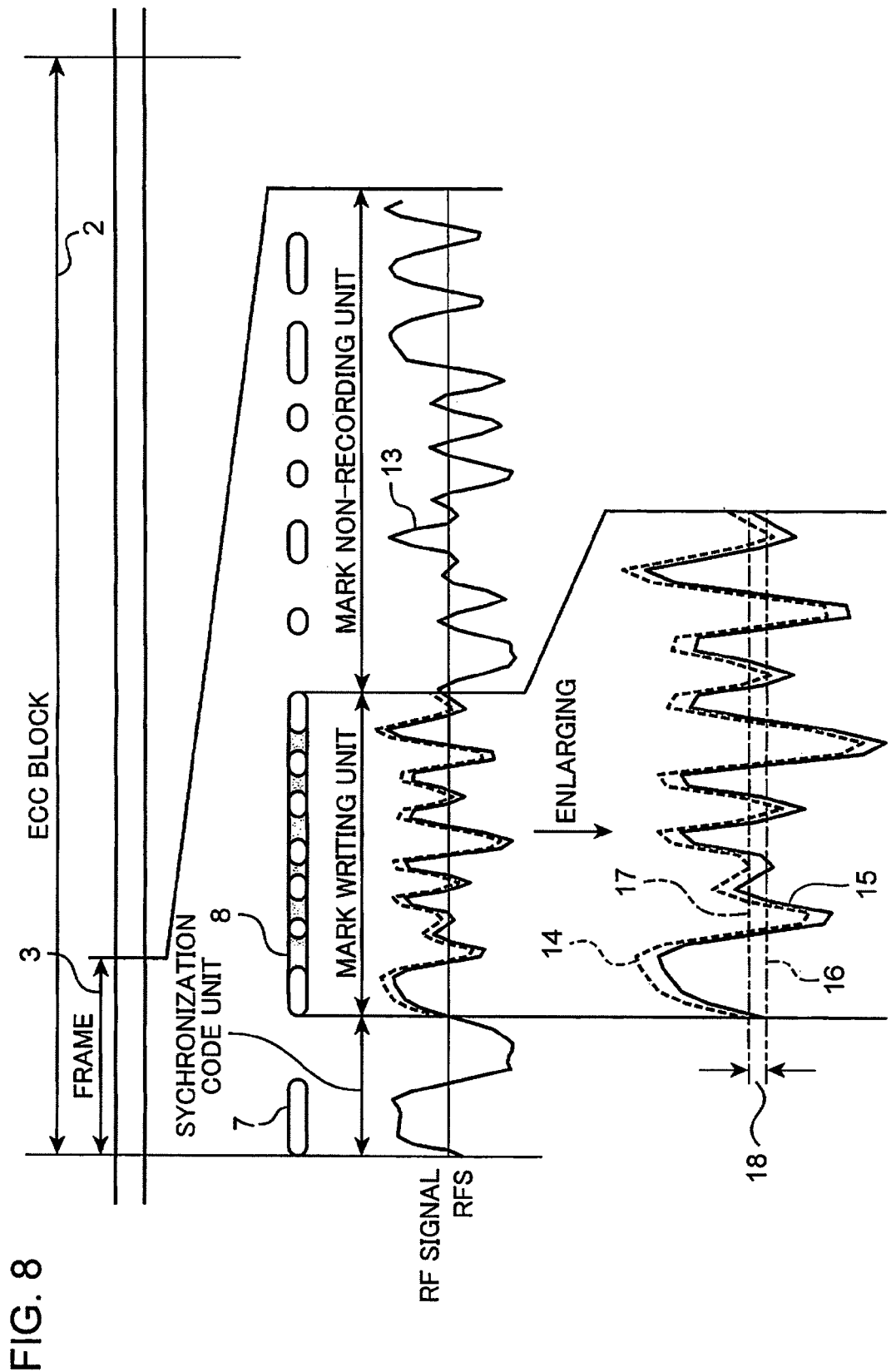
FIG. 8 is a timing chart showing a mark detection process according to Embodiment 1 of the present invention.

FIG. 8 is a timing chart for illustrating the mark detection process according to Embodiment 1 of the present invention. An ECC block 2, frame 3, concave-convex pits 7 and recordable mark 8 shown in FIG. 8 are same as those shown in FIG. 2.

An RF signal 13 shown in FIG. 8 is an analog waveform RF signal RFS that is output from the RF signal processor 111. There is a synchronization code unit at the head of the RF signal RFS, followed by an apparently random pit string as data that are in line with a prescribed modulation rule. An RF signal 14 shown by a dashed line represents an RF signal obtained after recording the recordable mark, and an RF signal 15 shown by a solid line represents an RF signal obtained before recording the recordable mark. The RF signal 14 indicates a change in the reflectance ratio with respect to the RF signal 15. An average value 17 of the RF signals, shown by a chain line, which is obtained after recording the recordable mark, is higher than an average value 16 of the RF signals, shown by a two-dot chain line, which is obtained before recording the recordable mark. In other words, the presence/absence of the recordable mark can be detected as a difference 18 between the average value of the RF signals that is obtained when there is a recordable mark, and the average value of the RF signals that is obtained when there is no recordable mark. The mark detector 115 measures an average value of the amplitudes of the RF signals and detects a reflectance ratio change amount by monitoring the fluctuations in the measured amplitude average value.

The mark detector 115 may integrate RF signal waveforms of a mark writing unit in which the recordable mark is recorded, and detect the recordable mark based on the change in the integral amount. In other words, the mark detector 115 may detect an integral value of the RF signals within the emission section in which the laser beam is radiated with the second laser power, and an integral value of the RF signals within a section that is outside, and has the same length as, the emission section in which the laser beam is radiated with the second laser power, and then detect the reflectance ratio change amount by obtaining the difference between these two detected integral values.

Moreover, the mark detector 115 may acquire information on a pit length from the demodulating circuit 113, and calculate an average value by using only values located in the vicinity of the center of pits or lands of a certain length or more. Specifically, the mark detector 115 detects only the amount of change in the reflectance ratio at the center of the concave-convex pit, whose detected pit length is equal to or longer than the certain length. The occurrence of errors during the calculation of the amplitude average value, which is caused by the random arrangement of long and short pits in the concave-convex pits, can be reduced. The mark detector 115 may also calculate the average value by using only the pits or lands of the same length.

In addition, the mark detector 115 may detect a change in the reflectance ratio, which is caused by recording the recordable mark, as a subtle fluctuation of an RF signal. For instance, as shown in FIG. 8, compared to the RF signal 15 obtained before recording the recordable mark, the RF signal 14 obtained after recording the recordable mark is changed (shifted) subtly on a time axis due to the impact of the recordable mark. The mark detector 115 can detect the presence/absence of the recordable mark by performing a predetermined statistical process on the subtle change of the RF signal on the time axis. The statistical process means a process of, for example, deriving general jitter values. In other words, the presence/absence of the recordable mark can be detected based on a difference between jitter values.

Figure 9:
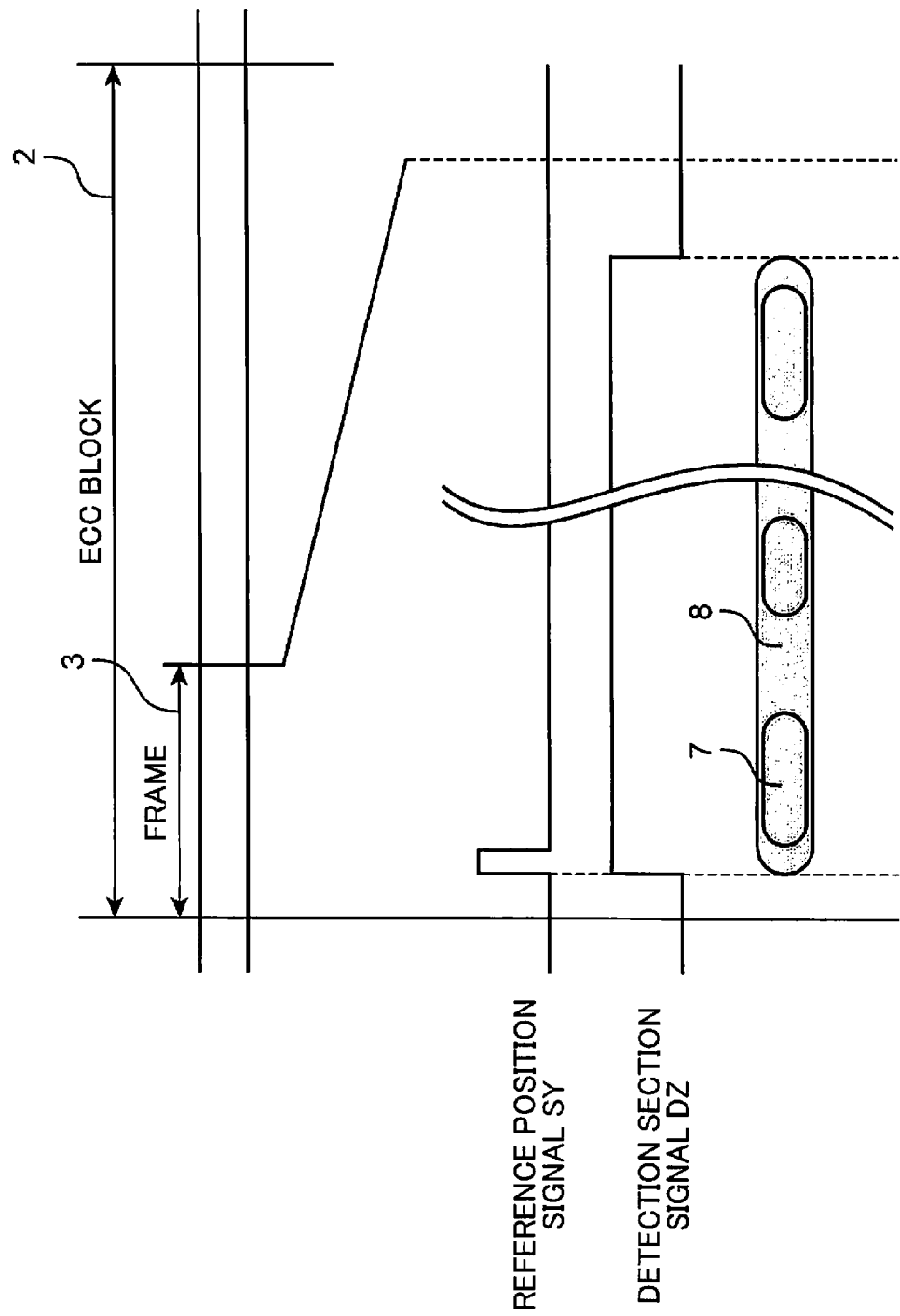
FIG. 9 is a timing chart for illustrating another recordable mark detection method according to Embodiment 1 of the present invention.

A recordable mark detection method shown in FIG. 9 may be used as well. FIG. 9 is a timing chart for illustrating another recordable mark detection method according to Embodiment 1 of the present invention.

In FIG. 9, the timing generation unit 106 outputs a detections section signal DZ to the mark detector 115 at a section in which the recordable mark should be recorded, in order to detect whether the recordable mark is recorded in a recordable mark recording section that is known prior to the recordable mark detection. In the section at which the detection section signal DZ is output, the mark detector 115 determines that the recordable mark is recorded when the optical disk 1 is reproduced unstably.

For example, the mark detector 115 detects that a lock on a PLL (Phase Lock Loop) circuit is removed in the section in which the detection section signal DZ is output. The removal of the lock on the PLL circuit means that the frequency is shifted by a predetermined reference value or more.

When the mark detector 115 detects the recordable mark as described above, recordable mark detection sensitivity thereof can be improved by not operating, for example, a baseline control function for adjusting the center of an RF signal amplitude, AGC function for keeping the amplitude at a constant width, PLL function for keeping the frequency constant, and other predetermined signal processing functions that are generally equipped in the optical disk device to keep the quality of a reproduction signal constant. These signal processing functions are generally operated in order to correct a change in an RF signal. Therefore, operating these signal processing functions reduces the fluctuations of the RF signals caused by the recordable mark, deteriorating the sensitivity of detection of the recordable mark.

Figure 10:
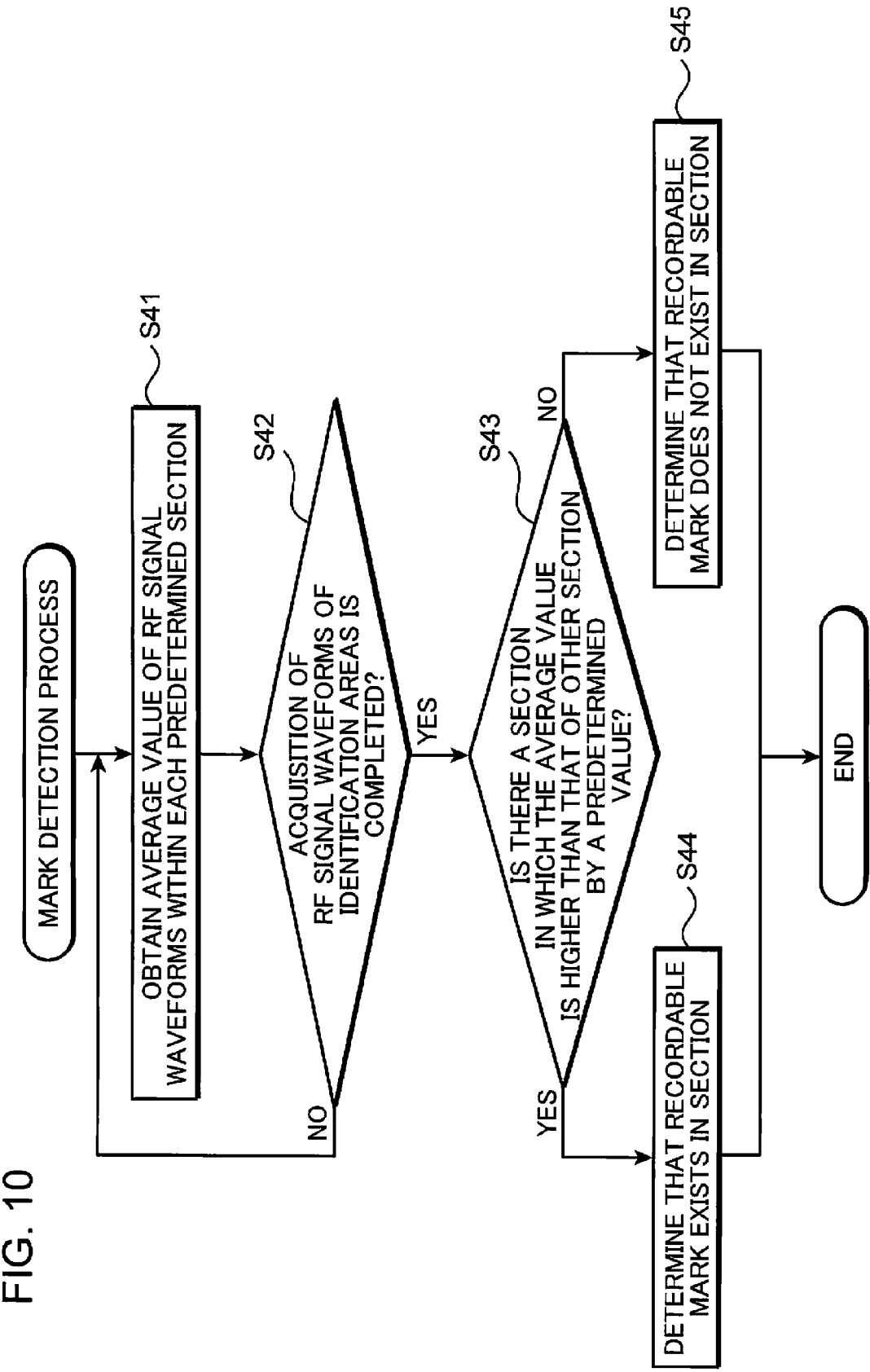
FIG. 10 is a flowchart for illustrating the mark detection process according to Embodiment 1 of the present invention in further detail.

FIG. 10 is a flowchart for illustrating the mark detection process according to Embodiment 1 of the present invention in further detail. Detailed operations performed by the mark detector 115 are described using FIG. 10.

Once the mark detection process is started, the mark detector 115 calculates an average value of signal levels of the RF signal waveforms in each predetermined section (step S41). The mark detector 115 then determines whether an acquisition of the RF signal waveforms of identification areas is completed or not (step S42). When it is determined that the acquisition of the RF signal waveforms of the identification areas is not yet completed (NO in step S42), the process returns to step S41.

When, on the other hand, it is determined that the acquisition of the RF signal waveforms of the identification areas is completed (YES in step S42), the mark detector 115 determines whether or not there exists a section in which the average value of the signal levels of the RF signal waveforms is higher than that of another section by a predetermined value or more (step S43). When it is determined that there exists the section in which the average value of the signal levels of the RF signal waveforms is higher than that of the other section by the predetermined value or more (YES in step S43), the mark detector 115 determines that the recordable mark exists in this section (step S44). When it is determined that there is no such a section in which the average value of the signal levels of the RF signal waveforms is higher than that of the other section by the predetermined value or more (NO in step S43), the mark detector 115 determines that the recordable mark does not exist in this section (step S45).

In this manner, the recordable mark can be written onto the optical disk having the main information recorded thereon by the concave-convex pits, by changing the reflectance ratio of the reflective film formed on the concave-convex pits, by using the relatively inexpensive low-power laser light source, instead of using an industrial special device or high-power laser light source.

Moreover, the recordable mark can be recorded by, for example, controlling laser power with a low frequency band being equal to the integral multiple of a frame length, because highly precise pulse recording with one channel bit width is unnecessary. Because a fast and highly precise laser drive circuit that is used in a recording optical disk is not required, an inexpensive optical disk device can be configured.

It is difficult for a user to specify the presence of the recordable mark because the recordable mark is not in the form of a stripe that is visible with a magnifying glass. This improves the security of the information recorded by the recordable mark.

In addition, there is no restriction that the recordable mark has to be formed on a synchronization code pattern, and a modulation pattern of the concave-convex pits configuring the base for recording the recordable mark thereon does not have to be a predetermined fixed pattern. Therefore, the recording device for recording the recordable mark can be set up anywhere on the optical disk, which is advantageous in increasing the operational flexibility.

Embodiment 2

Next is described an optical disk device according to Embodiment 2. Note that the configuration of the optical disk device according to Embodiment 2 is same as that of the optical disk device 100 according to Embodiment 1. Therefore, the descriptions thereof are omitted, and only the differences with the optical disk device 100 are described hereinafter.

Figure 11:
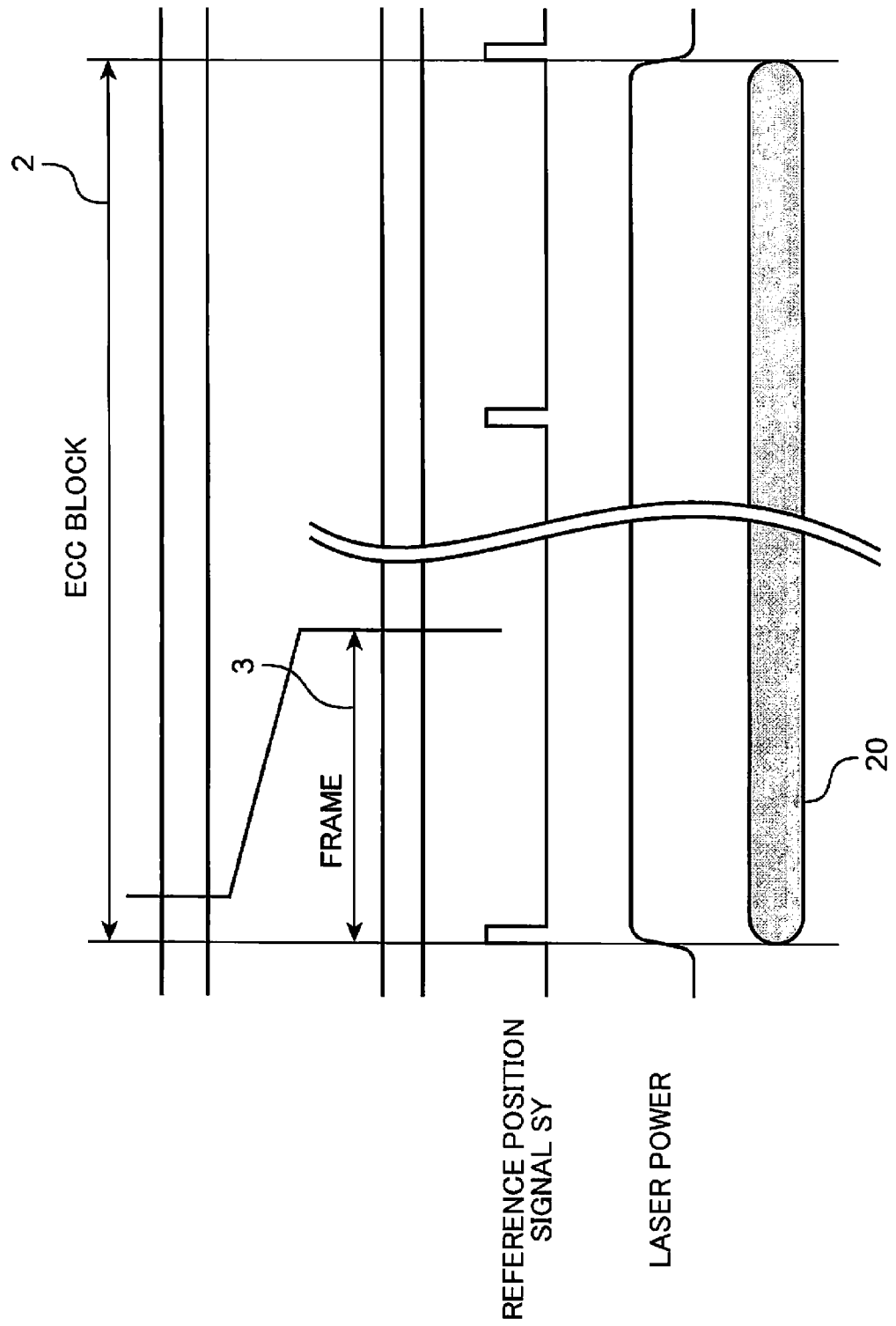
FIG. 11 is a timing chart for illustrating operations performed by a timing generation unit according to Embodiment 2 of the present invention.

The present invention can provide several possible recordable mark formation methods by devising the operations of the timing generation unit 106. FIG. 11 is a timing chart for illustrating operations performed by the timing generation unit according to Embodiment 2 of the present invention. Because components of the optical disk device according to Embodiment 2 are same as those shown in FIG. 1, the descriptions thereof are omitted, and only the operations of the timing generation unit that are different from those described in Embodiment 1 are described hereinafter.

In Embodiment 2, the timing generation unit 106 obtains a recordable mark recording section that is equal to the integral multiple of the reference position signal SY. In other words, the length of the emission section in which the laser beam is radiated with the second laser power is preferably equal to the integral multiple of a frame interval of the concave-convex pits. Accordingly, the beginning and end of the recordable mark can be configured in units of frames.

The length of the recordable mark can be made equal to the length from a reference position signal SY that is output from a head frame of a certain ECC block, to a reference position signal SY that is output from a head frame of the next ECC block, to record the recordable mark. In this manner, the beginning and end of the recordable mark can be managed and configured easily in units of ECC blocks.

In the optical disk device, the ECC blocks are normally managed and associated with physical address information recorded by the concave-convex pits. Therefore, the starting point and ending point in the process of recording the recordable mark can be managed relatively easily by making a recordable mark recording length equal to the integral multiple of each ECC block.

In other words, the main information, recorded on the optical disk 1 by the concave-convex pits, is configured in units of error correction blocks in which error correction information are added to a certain unit of user data. The mark recording controller 104 controls the emission section in which the laser beam is emitted with the second laser power, in units of error correction blocks, the emission section being generated by the timing generation unit 106. In so doing, the emission section generated by the timing generation unit 106, in which the laser beam is emitted with the second laser power, is equal to the integral multiple of the unit length of each error correction block.

When switching the laser power to the second laser power for such a long period of time, the sensitivity of a photodetector can be switched in this emission section, and a phase-difference servo can be operated during the second laser power light emission as well. In other words, the focus and tracking controller 112 carries out the tracking control within the emission section in which the laser beam is emitted with the second laser power.

When detecting the recordable mark written as described above, the average value of the RF signals becomes stable due to the long recordable mark, the result of the detection of the recordable mark is not affected by a disturbance caused by damage or contamination on the medium. Furthermore, since the recording section is long, the recordable mark can be detected, not based on the average value of the RF signals, but based on, for example, the deterioration of a reproduction jitter of a modulation code of the main information, asymmetry change, or other parameters proportional to the amount of change in each RF signal.

Embodiment 3

Next is described an optical disk device according to Embodiment 3. Note that the configuration of the optical disk device according to Embodiment 3 is same as that of the optical disk device 100 according to Embodiment 1. Therefore, the descriptions thereof are omitted, and only the differences with the optical disk device 100 are described hereinafter.

Figure 12:
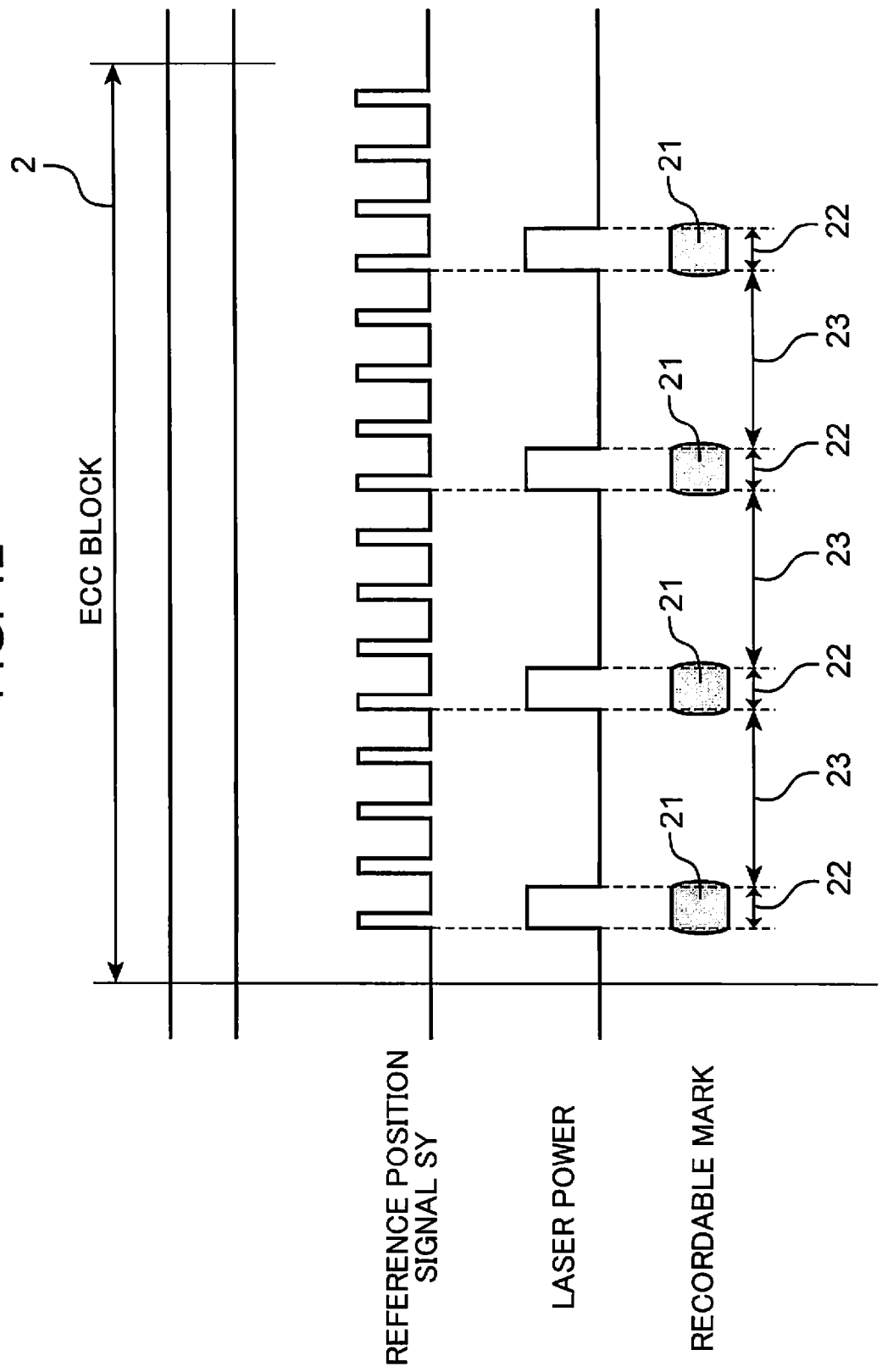
FIG. 12 is a timing chart for illustrating operations performed by the timing generation unit according to Embodiment 3 of the present invention.

FIG. 12 is a timing chart for illustrating operations performed by the timing generation unit according to Embodiment 3 of the present invention. Because components of the optical disk device according to Embodiment 3 are same as those shown in FIG. 1, the descriptions thereof are omitted, and only the operations of the timing generation unit that are different from those described in Embodiments 1 and 2 are described hereinafter. In Embodiment 3, a recordable mark 21 is recorded at intervals of, for example, four frames.

In an emission section 22, the laser power is switched to the second laser power equal to or greater than a normal reproduction power, and then the recordable mark 21 is recorded.

In this emission section 22, the photodetector of the optical pickup 109 becomes saturated, and consequently a regular optical pickup output signal P0 can no longer be output. In such a case, the regular signal is not input to the focus and tracking controller 112 either, temporarily making the focus and tracking controller 112 unable to perform the tracking control on the optical pickup 109.

In Embodiment 3, therefore, the emission section 22 in which the light is emitted with the second laser power in order to record the write mark 21 has a length equal to or less than the length corresponding to one frame, and the focus and tracking controller 112 puts on hold a tracking servo of a phase difference signal in the emission section 22. The focus and tracking controller 112 then performs a recovery operation on the tracking control in a section 23 between adjacent recordable mark 21, which has a length equal to or longer than the length corresponding to three frames.

In other words, when emitting the laser beam using the second laser power, the focus and tracking controller 112 puts the tracking control on hold. When the concave-convex pits include the synchronization codes and the distance between the synchronization codes corresponds to the length corresponding to one frame, the length of the emission section 22 in which the laser beam is radiated with the second laser power is equal to or less than the length corresponding to one frame, and the distance between this emission section 22 and the next emission section 22 is equal to or longer than the length corresponding to three frames.

Note that when the demodulating circuit 113 incorporates an automatic gain control (AGC) circuit or PLL circuit, it is preferred that the circuit be put on hold so that the circuit does not respond to a fluctuation of the optical pickup output signal P0 caused by the second laser power. Specifically, when the laser beam is radiated with the second laser power, the demodulating circuit 113 puts a frequency comparison function or phase comparison function of the PLL circuit on hold.

Embodiment 4

Next is described an optical disk device according to Embodiment 4. Note that the configuration of the optical disk device according to Embodiment 4 is same as that of the optical disk device 100 according to Embodiment 1. Therefore, the descriptions thereof are omitted, and only the differences with the optical disk device 100 are described hereinafter.

Figure 13:
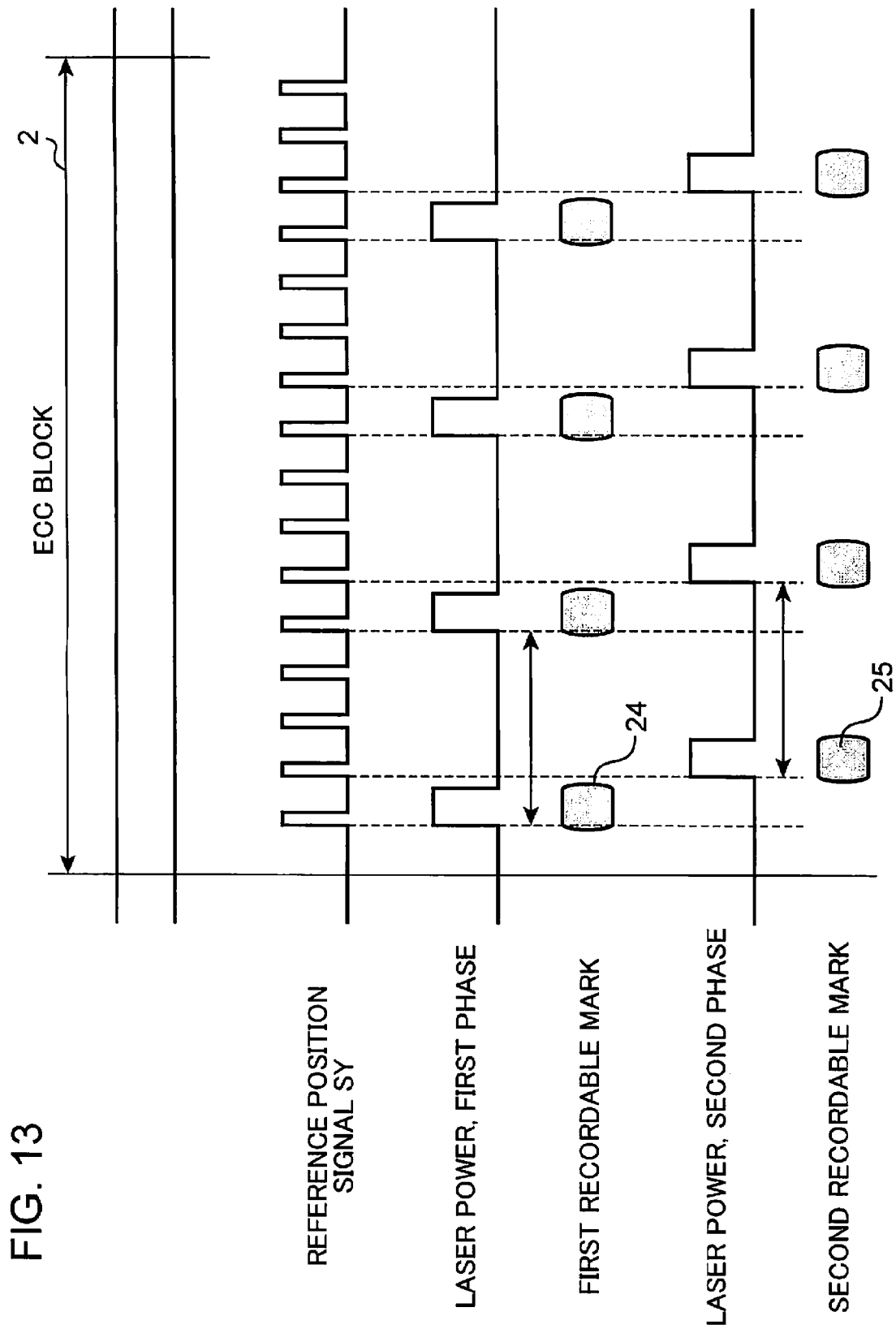
FIG. 13 is a timing chart for illustrating operations performed by the timing generation unit according to Embodiment 4 of the present invention.

FIG. 13 is a timing chart for illustrating operations performed by the timing generation unit according to Embodiment 4 of the present invention. In FIG. 13, the recordable mark is recorded every four frames as in Embodiment 3, but there are two types of recording modes in Embodiment 4. The timing generation unit 106 generates a plurality of emission timing at which the laser beam is emitted with the second laser power at regular intervals, within the error correction blocks.

As shown in FIG. 13, when the laser beam with the second laser power is emitted in a first phase of a four-frame cycle, a first recordable mark 24 is formed on the optical disk 1. When emitting the laser beam having the second laser power in a second phase of the four-frame cycle, which is shifted from the first phase by one frame, a second recordable mark 25 is formed on the optical disk 1. The mark recording controller 104 instructs the timing generation unit 106 to record the recordable mark in either the first phase or the second phase.

The timing generation unit 106 generates either one of first emission timing and second emission timing that are determined previously so as not to overlap with each other on the optical disk 1. The mark recording controller 104 instructs the timing emission unit 106 to select either the first emission timing or the second emission timing.

In other words, two types of information can be recorded and identified by detecting the phase in which the recordable mark is recorded, when detecting the recordable mark. The two types of information can correspond to, for example, "0" and "1," which are binary data. When the adjacent recordable marks are located at intervals of four frames, maximum of four types of information can be recorded by shifting each of the phases by one frame, and correspond to binary data of "00," "01, "10," "11" and the like. In this case, the mark detector 115 needs to have a plurality of detecting circuits for performing detection processes only in the sections related to the respective phases.

The mark detector 115 detects the reflectance ratio change amount in the predetermined first emission timing and the reflectance ratio change amount in the second emission timing, and detects a binary datum corresponding to the value "0" when the reflectance ratio change amount is detected in the first emission timing, and corresponding to the value "1" when the reflectance ratio change amount is detected in the second emission timing.

Embodiment 5

Next is described an optical disk device according to Embodiment 5. Note that the configuration of the optical disk device according to Embodiment 5 is same as that of the optical disk device 100 according to Embodiment 1. Therefore, the descriptions thereof are omitted, and only the differences with the optical disk device 100 are described hereinafter.

Figure 14:
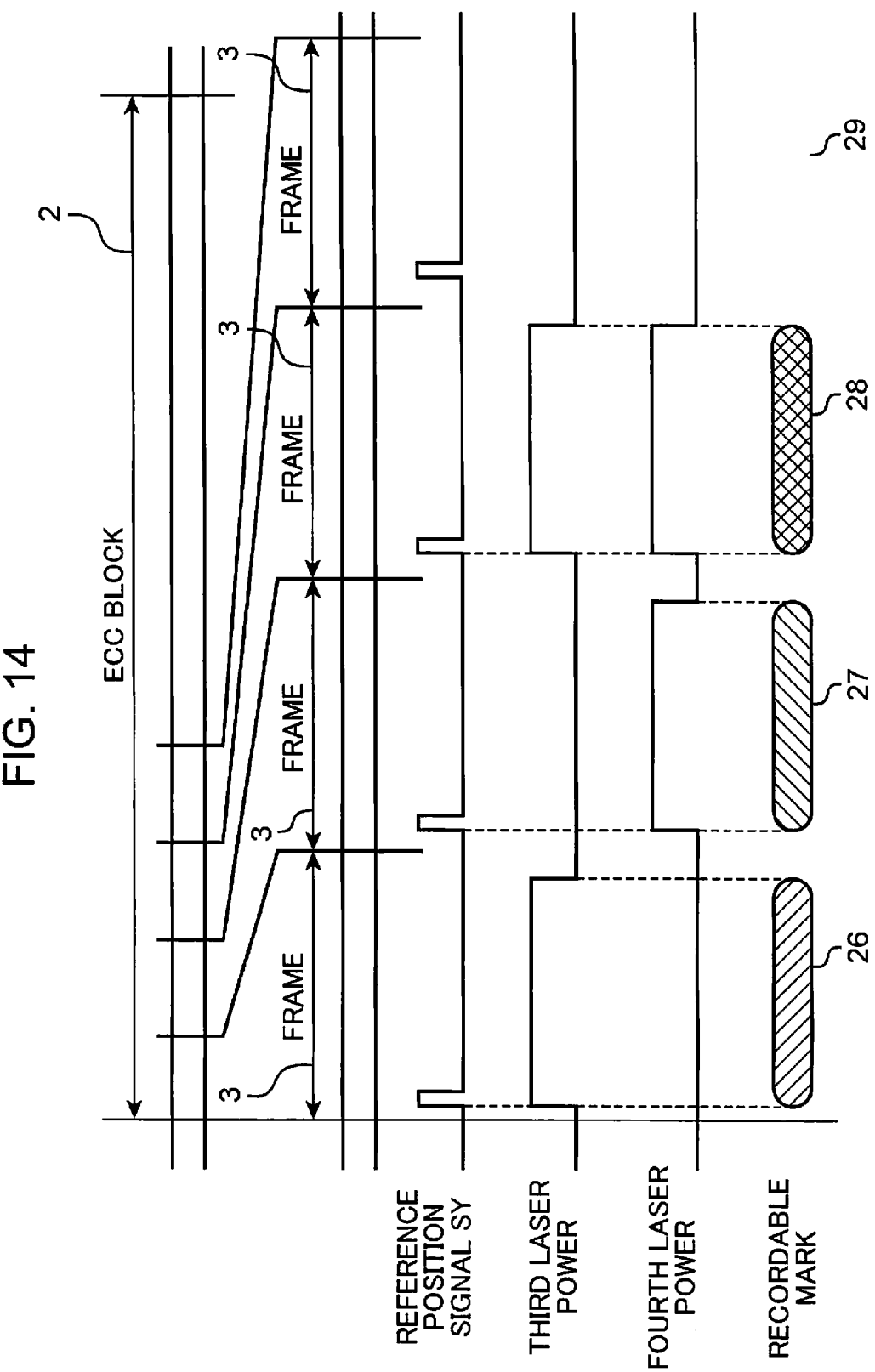
FIG. 14 is a timing chart of the mark recording operation, illustrating operations performed by a mark recording controller and timing generation unit according to Embodiment 5 of the present invention.

FIG. 14 is a timing chart for illustrating operations performed by the mark recording controller and the timing generation unit according to Embodiment 5 of the present invention.

In Embodiment 5, the mark recording controller 104 prepares two more types of the second laser powers, a third laser power and a fourth laser power greater than the third laser power, and uses these two types of laser powers according to a frame for recording a recordable mark.

A recordable mark 26 is written by radiating a laser beam with the third laser power. A recordable mark 27 is written by radiating a laser beam with the fourth laser power. A recordable mark 28 is written by radiating the laser beam with the third laser power and then the laser beam with the fourth laser power.

In Embodiment 5, a plurality of different types of recordable marks are formed on the optical disk 1 by using the plurality of laser powers. Because the third laser power is different than the fourth laser power, the difference 18 between the average values of the RF signals detected by the mark detector 115 illustrated in FIG. 8 varies. In Embodiment 5, the mark detector 115 detects four types of values; an average value of the RF signals corresponding to the recordable mark 26, an average value of the RF signals corresponding to the recordable mark 27, an average value of the RF signals corresponding to the recordable mark 28, and an average value of the RF signals corresponding to a section 29 with no recordable marks. Thus, these values can be used as 2-bit binary data as in Embodiment 4.

Furthermore, when the recordable marks are not recorded adequately after being recorded due to contamination on the optical disk or some other reason, the laser power can be increased from the third laser power to the fourth laser power to form the recordable marks again. Whether the recordable marks are formed properly or not can be estimated from the amount of change in the average value of the RF signals shown in FIG. 4.

Embodiment 6

Next is described an optical disk device according to Embodiment 6. Note that the configuration of the optical disk device according to Embodiment 6 is same as that of the optical disk device 100 according to Embodiment 1. Therefore, the descriptions thereof are omitted, and only the differences with the optical disk device 100 are described hereinafter.

Figure 15:
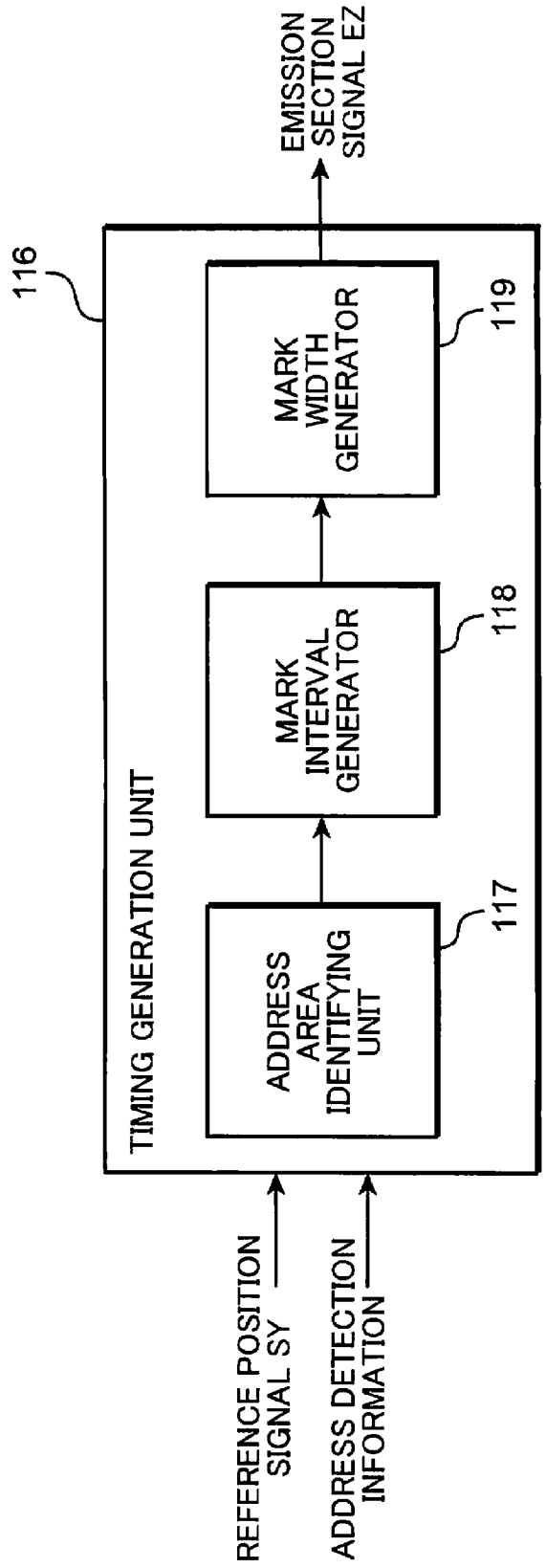
FIG. 15 is a block diagram showing a detailed configuration of a timing generation unit according to Embodiment 6 of the present invention.

FIG. 15 is a block diagram showing a detailed configuration of a timing generation unit according to Embodiment 6 of the present invention. The optical disk device 100 has a timing generation unit 116 in place of the timing generation unit 106. In FIG. 15, the timing generation unit 116 has an address area identifying unit 117, mark interval generator 118, and mark width generator 119. The address area identifying unit 117 identifies whether a specific frame includes address information or not. Here, the address area identifying unit 117 acquires, from the demodulating circuit 113, address detection information required in identifying an address area (frame) having the address information. The mark interval generator 118 determines a cycle of the emission section signal EZ. The mark width generator 119 generates the emission section signal EZ having a predetermined width.

Figure 16:
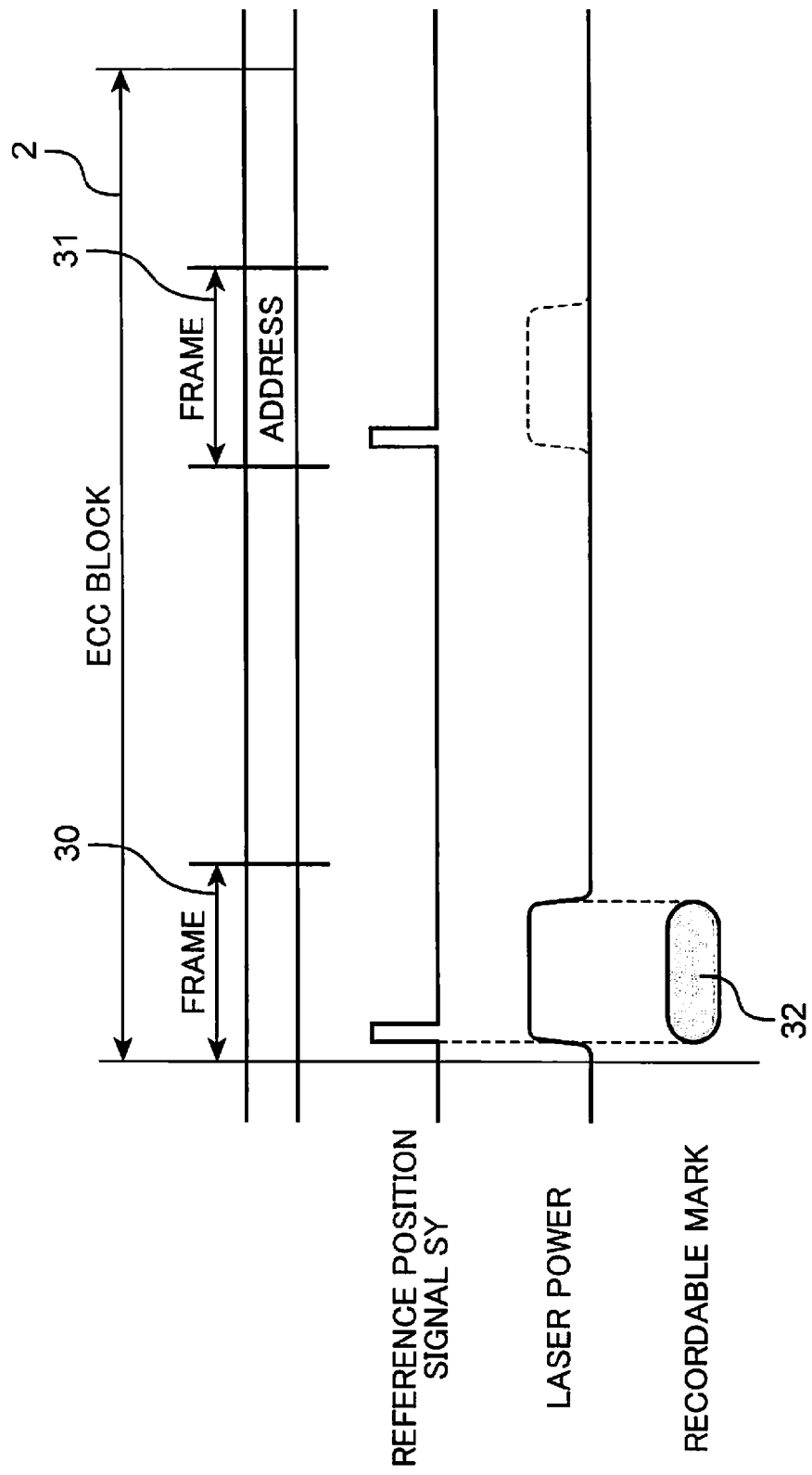
FIG. 16 is a timing chart for illustrating operations performed by the timing generation unit according to Embodiment 6 of the present invention.

Next is described a recordable mark recording operation according to Embodiment 6 with reference to a timing chart shown in FIG. 16. FIG. 16 is a timing chart for illustrating operations performed by the timing generation unit according to Embodiment 6 of the present invention.

In FIG. 16, the ECC block 2 includes a frame 30 without the address information and a frame 31 with the address information. The timing generation unit 116 according to Embodiment 6 does not output the emission section signal EZ in a section of the frame 31 having the address information. As a result, the emission section in which the laser beam is emitted with the second laser power is the only section that corresponds to the frame 30 without the address information. Therefore, although a recordable mark 32 is recorded in the frame 30 without the address information, the recordable mark 32 is not formed in the frame 31 having the address information because the laser power is not switched to the second laser power.

In other words, the main information that are recorded on the optical disk 1 by the concave-convex pits include the address information that indicate physical positions within the optical disk 1. The timing generation unit 116 generates emission timing so that the laser beam is radiated with the second laser power outside the area in which the address information are recorded.

Embodiment 3 had described an example in which the photodetector of the optical pickup 109 becomes saturated in the emission section in which the laser beam is emitted with the second laser power, and the RF signal processor 111 other than the focus and tracking controller 112 that performs servo control as a result of the saturation of the photodetector often cannot perform a normal signal process. When the AGC circuit or PLL circuit of the RF signal processor 111 is put on hold in this emission section, a normal signal cannot be output to the subsequent demodulating circuit 113 in the section where the AGC circuit or PLL circuit is put on hold. Consequently, the address information cannot be demodulated.

In Embodiment 6, the recordable marks are formed outside the section (frame) that includes the address information, as shown in FIG. 16. Therefore, even when a plurality of recordable marks are formed, the laser power is not switched to the second laser power in the frame in which the address information are recorded. Thus, the servo control and demodulation process can be performed, and the address information can be detected. For this reason, for example, the demodulating circuit 113 or the mark recording controller 104 can monitor the continuity of the address information to be demodulated, whereby skipping of tracks caused by the damage on the medium or a disturbance can be detected.

Embodiment 7

Next is described an optical disk device according to Embodiment 7. Note that the configuration of the optical disk device according to Embodiment 7 is same as that of the optical disk device 100 according to Embodiment 1. Therefore, the descriptions thereof are omitted, and only the differences with the optical disk device 100 are described hereinafter.

Figure 17:
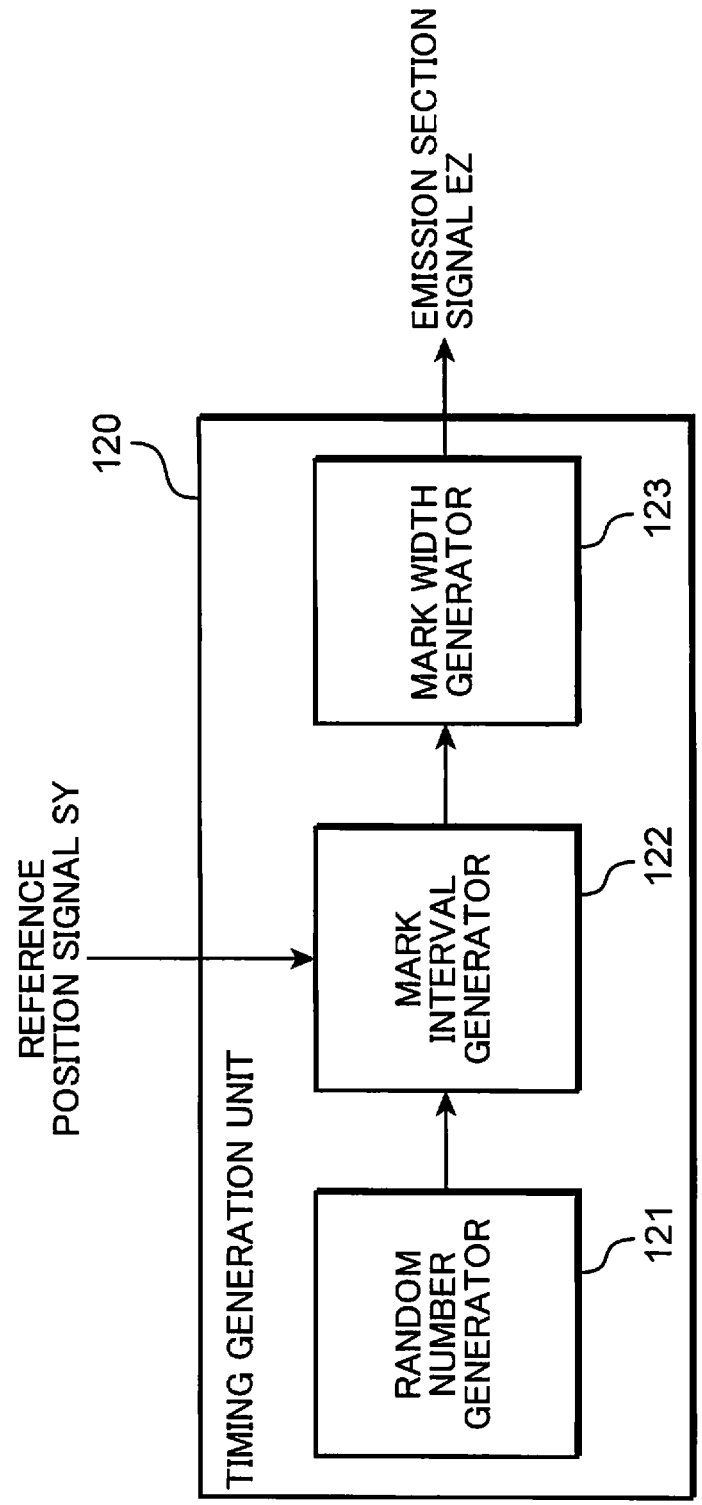
FIG. 17 is a block diagram showing a detailed configuration of a timing generation unit according to Embodiment 7 of the present invention.

FIG. 17 is a block diagram showing a detailed configuration of a timing generation unit according to Embodiment 7 of the present invention. The optical disk device 100 has a timing generation unit 120 in place of the timing generation unit 106. In FIG. 17, the timing generation unit 120 has a random number generator 121, mark interval generator 122, and mark width generator 123. The random number generator 121 generates random numbers. The mark interval generator 122 randomly generates a cycle of the emission section signal EZ based on the random numbers generated by the random number generator 121. The mark width generator 123 generates the emission section signal EZ having a predetermined width.

In other words, the timing generator 120 generates random numbers and, based on the generated random numbers, randomly changes the cycle of the emission timing at which the laser beam is emitted with the second laser power.

Figure 18:
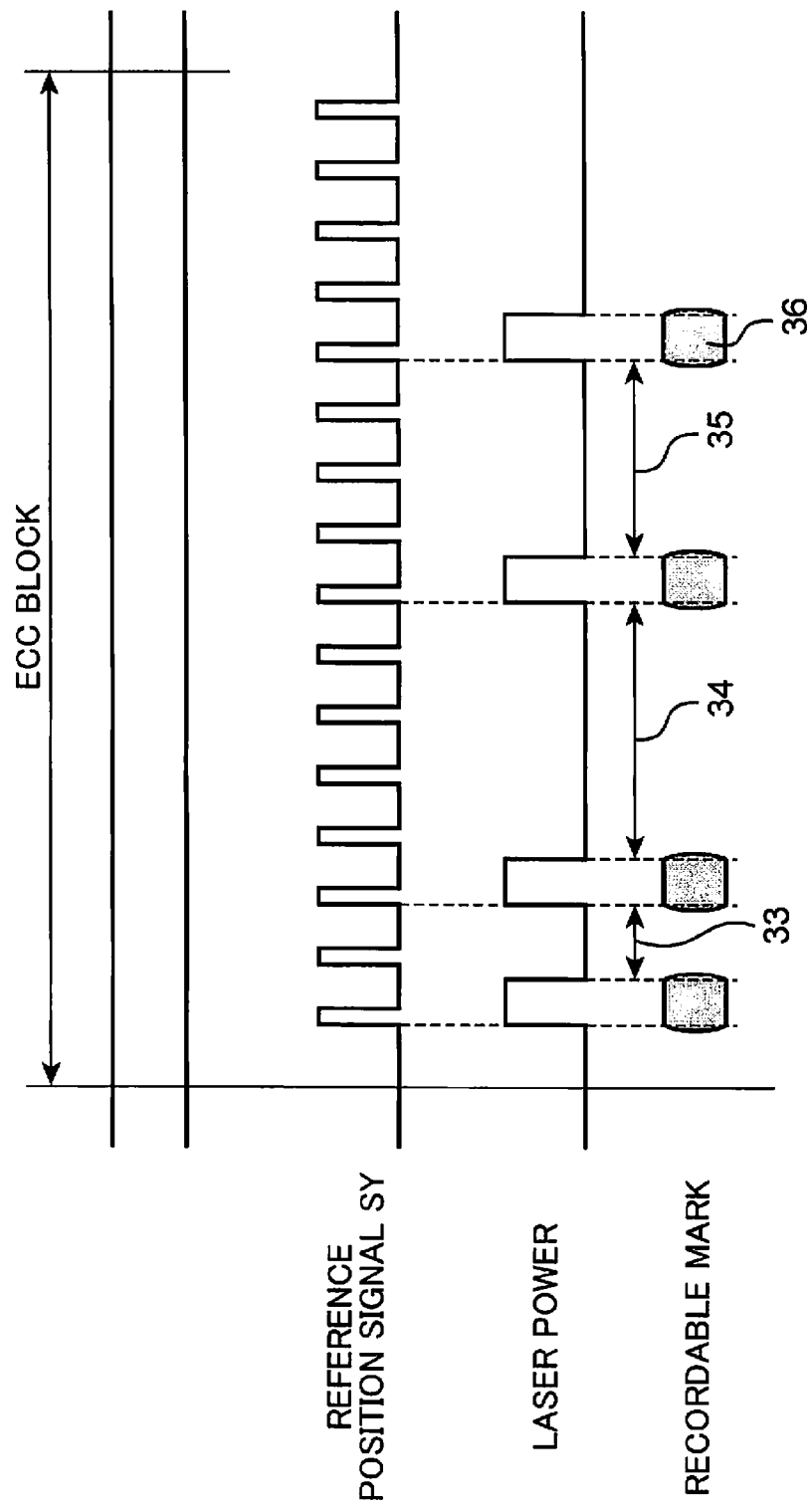
FIG. 18 is a timing chart for illustrating operations performed by the timing generation unit according to Embodiment 7 of the present invention.

Next is described a recordable mark recording operation according to Embodiment 7 with reference to a timing chart shown in FIG. 18. FIG. 18 is a timing chart for illustrating operations performed by the timing generation unit according to Embodiment 7 of the present invention. In FIG. 18, intervals 33, 34 and 35 between recordable marks 36 are changed randomly by the random numbers.

In Embodiment 7, the positions for recording the recordable marks 36 are located randomly. Therefore, when detecting the marks, the mark detector 115 needs to accurately understand the positions where the recordable marks 36 are recorded, and generate detection timing. However, the recordable marks can be recorded in a plurality of recording patterns by appropriately replacing a random number series of the random number generator 121.

Embodiment 8

Next is described an optical disk device according to Embodiment 8. Note that the configuration of the optical disk device according to Embodiment 8 is same as that of the optical disk device 100 according to Embodiment 1. Therefore, the descriptions thereof are omitted, and only the differences with the optical disk device 100 are described hereinafter.

Figure 19:
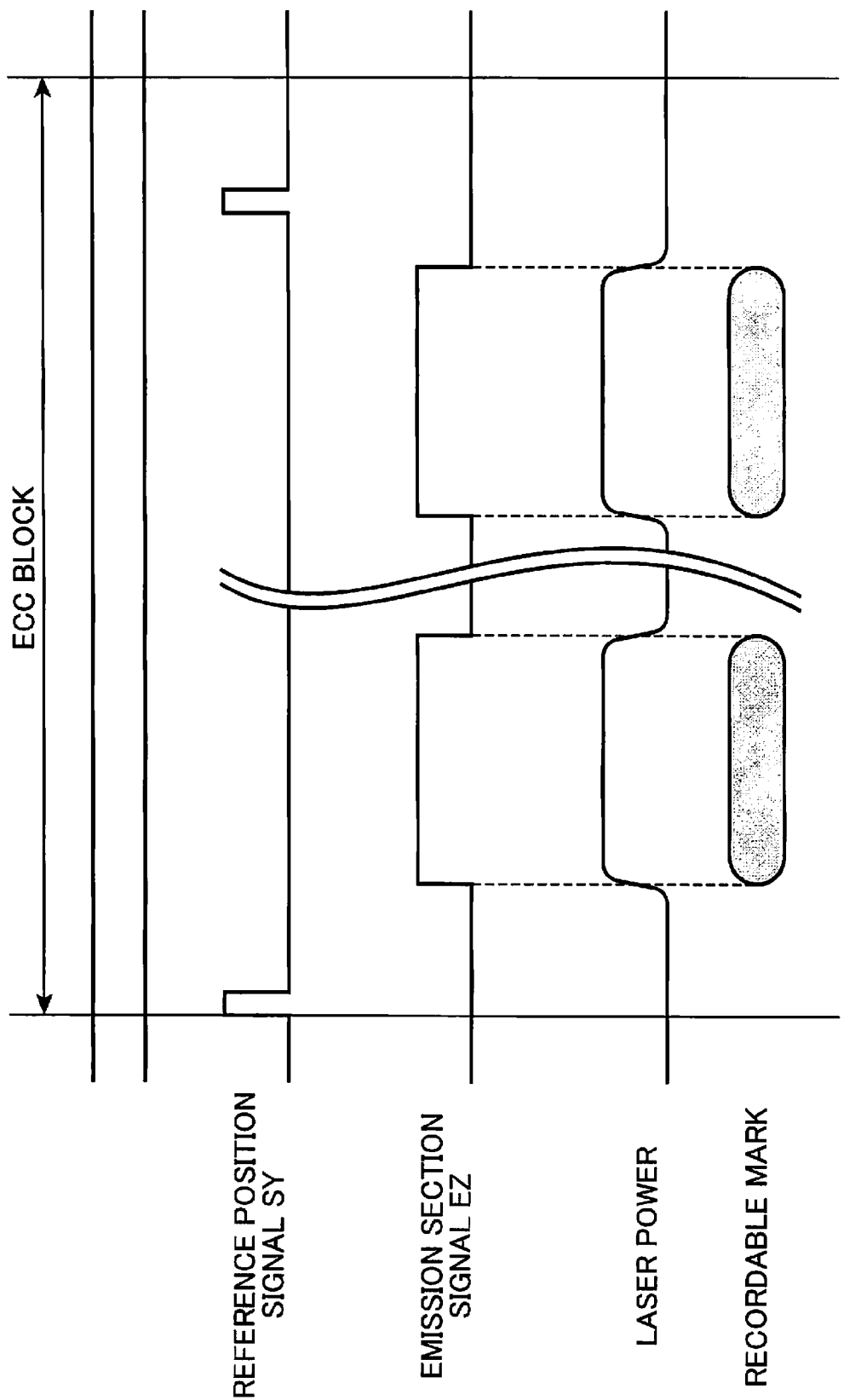
FIG. 19 is a timing chart for illustrating a recordable mark recording operation performed by the timing generation unit according to Embodiment 8 of the present invention.

FIG. 19 is a timing chart for illustrating a recordable mark recording operation performed by the timing generation unit according to Embodiment 8 of the present invention. In FIG. 19, a plurality of recordable marks are recorded within one frame between the reference position signals SY.

The timing generation unit 106 generates the emission section signal EZ for emitting the laser beam with the second laser power, in synchronization with a channel clock generated by the demodulating circuit 113. In Embodiment 8, the reference position signals SY and the timing at which the recordable marks are recorded are different. Therefore, when detecting the recordable marks, the mark detector 115 needs to accurately understand the positions where the marks are recorded, and generate the detection timing. However, because the emission section signal EZ is generated so as to record the plurality of recordable marks within one frame, the amount of information on the recorded recordable marks can be increased.

Note that the emission section in which the laser beam is emitted with the second laser power is preferably equal to or greater than ten times the length of the shortest pit length of the concave-convex pits.

Embodiment 9

Figure 20:
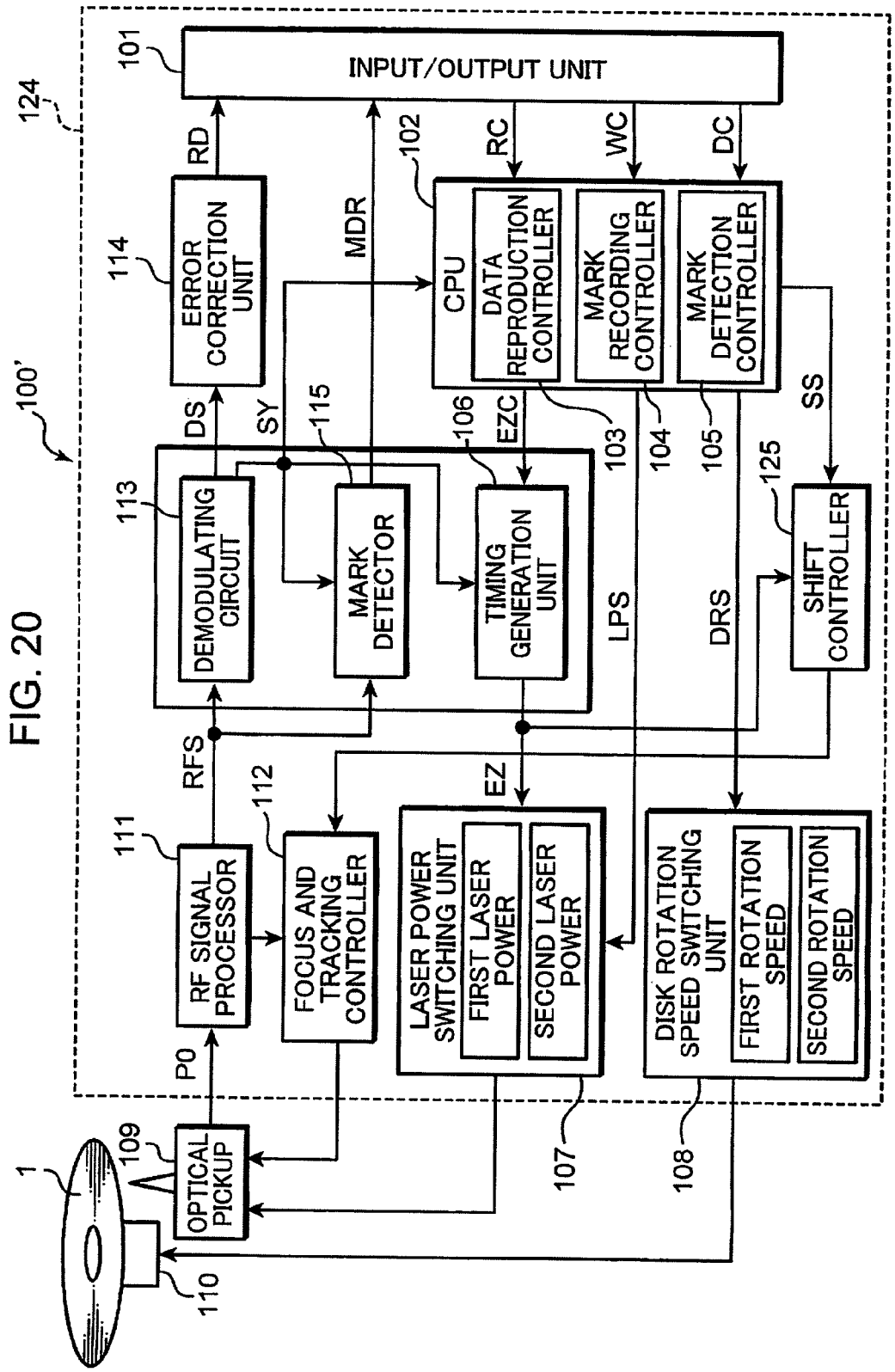
FIG. 20 is a block diagram showing a configuration of the optical disk device according to Embodiment 9 of the present invention.

Next is described an optical disk device according to Embodiment 9. FIG. 20 is a block diagram showing a configuration of the optical disk device according to Embodiment 9 of the present invention. Note that the same reference numerals as those of the configuration of the optical disk device 100 of Embodiment 1 are applied to the optical disk device 100' of Embodiment 9, and the descriptions thereof are omitted. The optical disk device 100' further has a shift controller 125.

The mark recording controller 104 of the CPU 102 outputs a shift control setting signal SS, and sets the shift controller 125 such that a laser beam radiation position shifts by a predetermined small distance in a radial direction of the optical disk when recording recordable marks. The shift controller 125 outputs a tracking control signal to the focus and tracking controller 112, such that the optical pickup 109 shifts with respect to the radial direction of the optical disk by a predetermined small distance in synchronization with the emission section signal EZ that is output from the timing generation unit 106 in accordance with the shift control setting signal SS.

Figure 21:
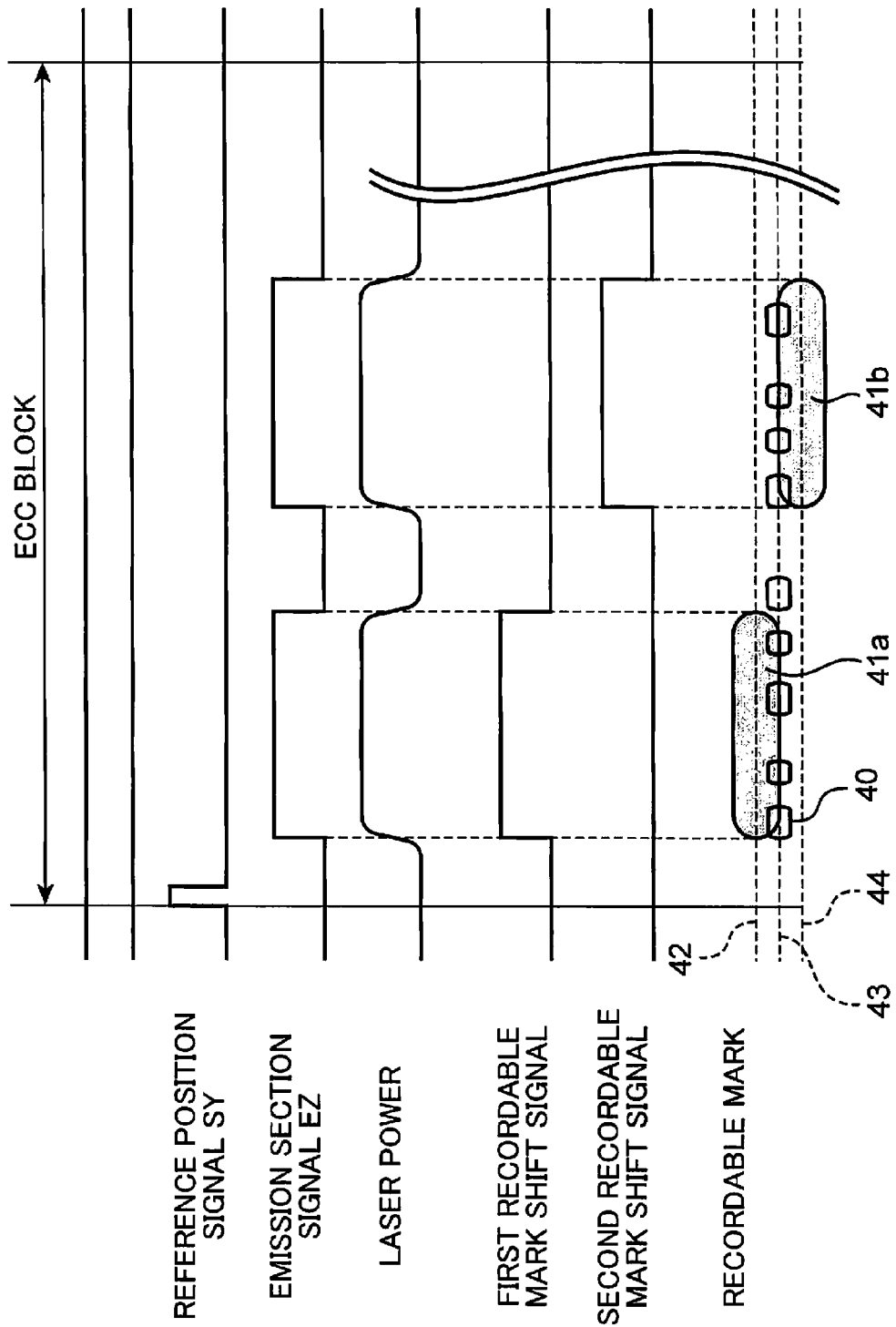
FIG. 21 is a timing chart for illustrating a recordable mark recording operation performed by the timing generation unit according to Embodiment 9 of the present invention.

FIG. 21 is a timing chart for illustrating a recordable mark recording operation performed by the timing generation unit according to Embodiment 9 of the present invention. In FIG. 21, recordable marks 41a and 41b are each recorded in a position that is shifted, by a small distance in the radial direction of the optical disk, from positions having concave-convex pits 40 recorded thereon.

The shift controller 125 generates a first recordable mark shift signal for recording a recordable mark by shifting the center of the recordable mark in the radial direction of the optical disk from the center of the pits to an inner circumferential side or outer circumferential side by a small distance, and a second recordable mark shift signal for recording a recordable mark by shifting the center of the recordable mark by a small distance in a direction opposite to the first recordable mark shift signal.

The shift controller 125 shifts the laser beam emitted from the optical pickup 109, from the center of the radial concave-convex pits on the optical disk by a predetermined distance in an inner circumferential direction or outer circumferential direction, in the emission timing for emitting the laser beam with the second laser power, which is generated by the timing generation unit 106.

In a section in which the first recordable mark shift signal is output by the shift controller 125, the recordable mark 41a is recorded by shifting the center of the recordable mark in the radial direction of the optical disk, from the center of the concave-convex pits 40 to the inner circumferential side or outer circumferential side by a small distance. Moreover, in a section in which the second recordable mark shift signal is output by the shift controller 125, the recordable mark 41b is recorded by shifting the center of the recordable mark by a small distance in a direction opposite to the first recordable mark shift signal.

For example, as shown in FIG. 21, a centerline 42 of the recordable mark 41a is shifted to the inner circumferential side from a centerline 43 of the concave-convex pits 40, and a centerline 44 of the recordable mark 41b is shifted to the outer circumferential side from the centerline 43 of the concave-convex pits 40.

When detecting the marks according to Embodiment 8, the optical pickup 109 detects asymmetry of the reflectance ratio of the reflected light, to detect not only the fact that the recordable marks are recorded, but also the fact that the recordable marks are shifted in the inner circumferential direction or outer circumferential direction.

In other words, the mark detector 115 detects that the distributions of the reflected light from the recordable marks are asymmetric with respect to the center of the concave-convex pits in the radial direction of the optical disk, measures the average value of the amplitudes of the RF signals of the asymmetric reflected light, and detects the reflectance ratio change amount by monitoring the fluctuations of the measured amplitude average value.

Embodiment 8 can increase the amount of information to be recorded, by shifting each recordable mark in the radial direction of the optical disk by a small distance.

Embodiment 10

Next is described an optical disk device according to Embodiment 10. Note that the configuration of the optical disk device according to Embodiment 10 is same as that of the optical disk device 100 according to Embodiment 1. Therefore, the descriptions thereof are omitted, and only the differences with the optical disk device 100 are described hereinafter.

Figure 22:
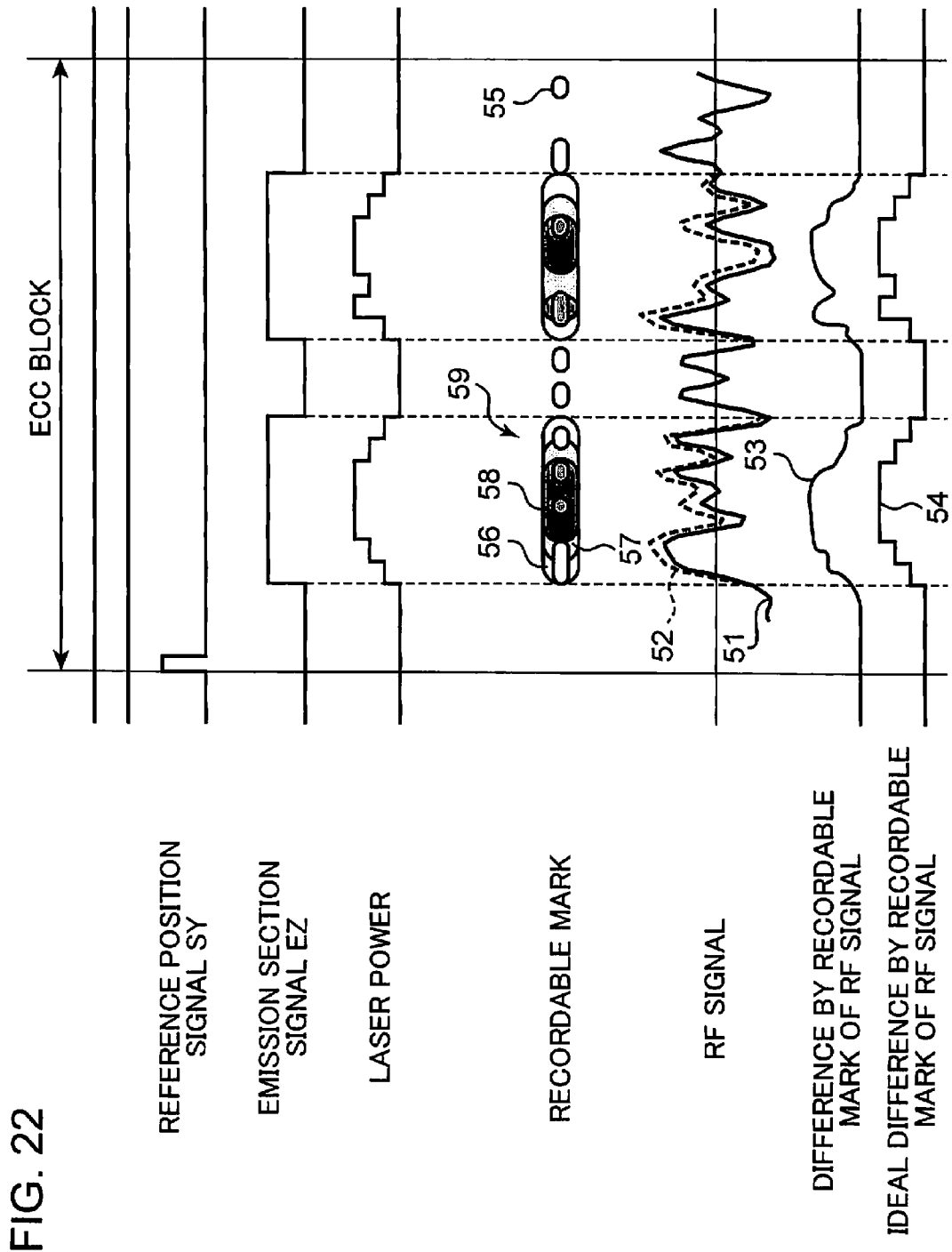
FIG. 22 is a timing chart for illustrating a recordable mark recording operation and recordable mark detection operation performed by the timing generation unit according to Embodiment 10 of the present invention.

FIG. 22 is a timing chart for illustrating a recordable mark recording operation and recordable mark detection operation performed by the timing generation unit according to Embodiment 10 of the present invention. Embodiment 10 shown in FIG. 22 outputs the laser beam with a different amplitude and acquires the RF signal waveform in a shape other than a rectangle, which is not affected by concave-convex pits 55 at the time of the detection of recordable marks.

When recording recordable marks, the laser power switching unit 107 changes the amplitude of the laser beam output by the optical pickup 109, by means of, for example, a predetermined pattern or a random pattern based on a random number series, and records recordable marks 59. As a result, a plurality of areas 56, 57 and 58 with different reflectance ratios are included in one recordable mark 59. In other words, at the emission timing for emitting the laser beam with the second laser power, which is generated by the timing generation unit 106, the laser power switching unit 107 performs control so that the second laser power is changed to a plurality of values in accordance with the predetermined pattern or the random pattern determined by the random number series.

FIG. 22 shows an RF signal 51 obtained before recording the recordable marks, an RF signal 52 obtained after recording the recordable marks, a difference 53 between the RF signal 51 and the RF signal 52, and an ideal difference 54 between the RF signal 51 and the RF signal 52.

In Embodiment 8, when detecting the recordable marks, the mark detector 115 compares the difference 53 obtained from the recordable mark of the reproduced RF signal, with the ideal difference 54 obtained from the recordable mark of the reproduced RF signal. When detecting the recordable marks, the mark detector 115 determines whether the difference 53 obtained from the recordable mark of the reproduced RF signal matches the ideal difference 54 obtained from the recordable mark of the reproduced RF signal.

In other words, at the emission timing for emitting the laser beam with the second laser power, which is generated by the timing generation unit 106, the mark detector 115 compares a difference value between the waveform of the RF signal obtained prior to the radiation of the laser beam and the waveform of the RF signal obtained after the radiation of the laser beam, with the predetermined pattern or the random pattern determined by the random number series. When the difference value matches the pattern, it is determined that the recordable marks are recorded properly. When the difference value does not match the pattern, it is determined that the recordable marks are not recorded properly.

Therefore, the detection of the recordable marks can be utilized as, for example, key authentication. When the difference 5343 of the RF signal that matches the ideal difference 54 of the RF signal is not detected at a correct recording position, the mark detector 115 determines that a correct key is not recorded as a recordable mark in advance, and prohibits the reproduction of content data recorded on the optical disk 1 by the concave-convex pits.

Embodiment 11

Next is described an optical disk device according to Embodiment 11. Note that the configuration of the optical disk device according to Embodiment 11 is same as that of the optical disk device 100 according to Embodiment 1. Therefore, the descriptions thereof are omitted, and only the differences with the optical disk device 100 are described hereinafter.

Figure 23:
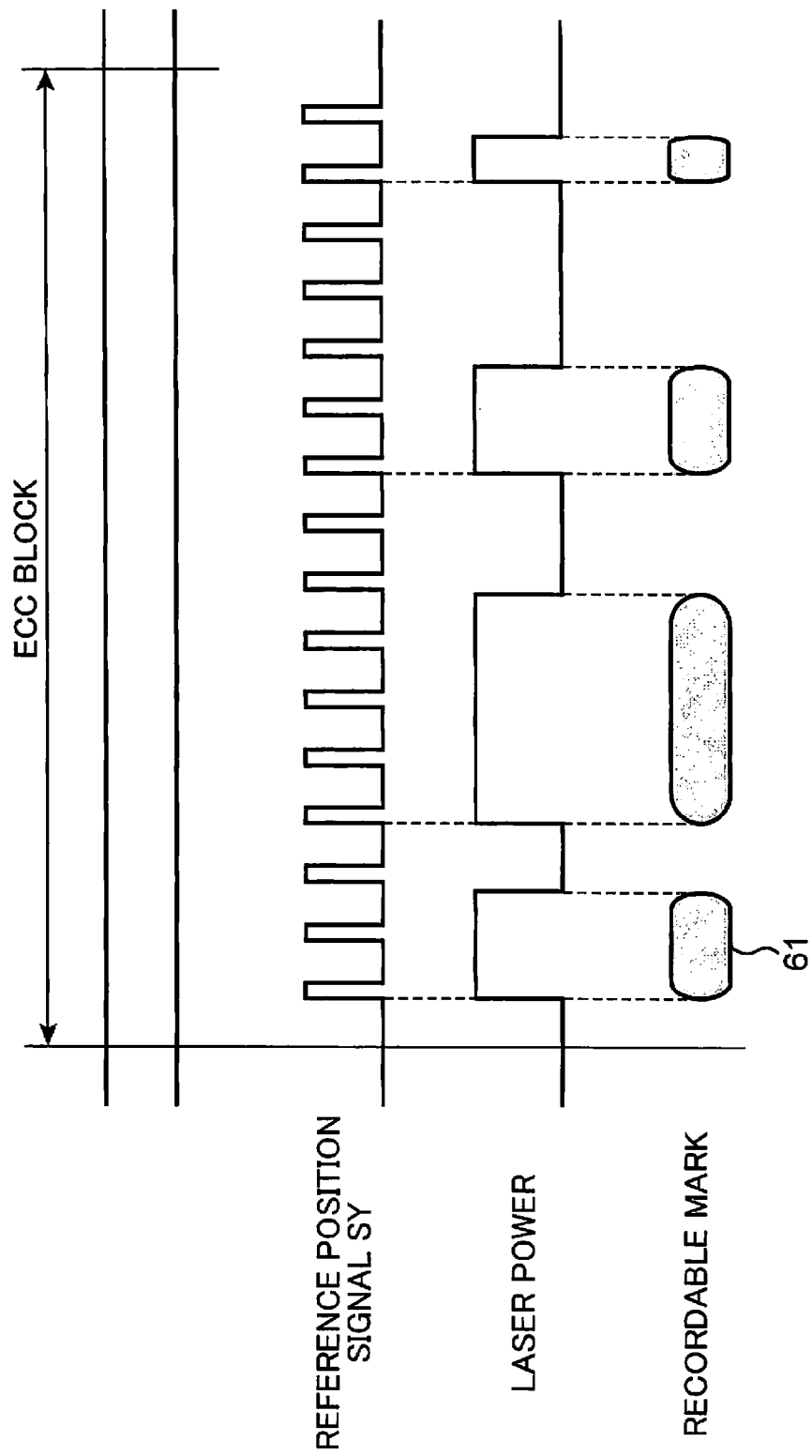
FIG. 23 is a timing chart for illustrating a recordable mark recording operation gperformed by the timing generation unit according to Embodiment 11 of the present invention.

FIG. 23 is a timing chart for illustrating a recordable mark recording operation performed by the timing generation unit according to Embodiment 11 of the present invention.

In FIG. 23, the cycle of a recording section for recording a recordable mark 61 and the cycle of a non-recording section are not constant, and are changed randomly by, for example, random numbers. Specifically, the length of the emission section in which the laser beam is radiated with the second laser power is determined by the random number series. The timing generation unit 106 generates random numbers and uses the generated random numbers to determine the length of the emission section in which the laser beam is radiated with the second laser power and the interval between this emission section and an emission section adjacent thereto.

In this case, because the recording position for recording the recordable mark 61 is changed randomly, the position in which the recordable mark 61 is recorded needs to be obtained accurately based on the random numbers, to generate the detection timing. However, the recordable marks can be recorded in a plurality of recording patterns by appropriately replacing the random number series.

Note that the specific embodiments described above mainly include inventions having the following configurations.

An optical disk device according to one aspect of the present invention is an optical disk device for writing a recordable mark onto an optical disk having main information recorded thereon by concave-convex pits, by changing a reflectance ratio of a reflective film formed on the concave-convex pits, the optical disk device having: an optical pickup; an RF signal processor that acquires an RF signal based on an output from the optical pickup; a reference position detector that demodulates the RF signal and detects a reference position signal; a rotation speed controller that switches a rotation speed of the optical disk between at least two rotation speeds; an emission timing generation unit that generates, according to the reference position signal, an emission timing at which a laser beam is radiated from the optical pickup at a predetermined position; a laser power controller that increases a laser power of the laser beam that is radiated from the optical pickup at the emission timing; a reflectance ratio change amount detector that detects, from the RF signal, an amount of change in a reflectance ratio of reflected light reflected from the optical disk; a concave-convex pit reproduction controller that sets a first rotation speed in the rotation speed controller and a first laser power in the laser power controller when reproducing the concave-convex pits formed on the optical disk; and a recordable mark recording controller that, when writing the recordable mark onto the optical disk, sets in the rotation speed controller a second rotation speed that is slower than the first rotation speed and a lowest rotation speed at which the concave-convex pits can be reproduced, and sets a second laser power greater than the first laser power in the laser power controller according to the emission timing.

According to this configuration, the RF signal is acquired based on an output from the optical pickup. The RF signal is demodulated, and the reference position signal is detected. The rotation speed controller switches the rotation speed of the optical disk between at least two rotation speeds. According to the reference position signal, the emission timing generation unit generates the emission timing at which the laser beam is radiated from the optical pickup at a predetermined position. The laser power controller increases the laser power of the laser beam radiated from the optical pickup at the emission timing. The reflectance ratio change amount detector detects, from the RF signal, the amount of change in the reflectance ratio of the reflected light reflected from the optical disk. When reproducing the concave-convex pits formed on the optical disk, the first rotation speed is set in the rotation speed controller, and the first laser power is set in the laser power controller. When writing the recordable mark onto the optical disk, the second rotation speed, which is slower than the first rotation speed and the lowest rotation speed at which the concave-convex pits can be reproduced, is set in the rotation speed controller. According to the emission timing, the second laser power greater than the first laser power is set in the laser power controller.

Therefore, the recordable mark can be written onto the optical disk having the main information recorded thereon by the concave-convex pits, by changing the reflectance ratio of the reflective film formed on the concave-convex pits, by using a relatively inexpensive low-power laser light source, instead of using an industrial special device or high-power laser light source.

It is preferred that the optical disk device further have a recordable mark detection controller, which, when detecting the recordable mark formed on the optical disk, performs control to detect the recordable mark based on the amount of change in the reflectance ratio that is detected by the reflectance ratio change amount detector.

According to this configuration, when detecting the recordable mark formed on the optical disk, the recordable mark can be detected based on the amount of change in the reflectance ratio that is detected by the reflectance ratio change amount detector.

It is also preferred, in the optical disk device, that the second rotation speed be equal to or less than ½ the lowest rotation speed. According to this configuration, the recordable mark can be written onto the optical disk at the second rotation speed that is equal to or less than ½ the lowest rotation speed.

It is preferred, in the optical disk device, that the second rotation speed be equal to or less than 1/10 of the first rotation speed. According to this configuration, the recordable mark can be written onto the optical disk at the second rotation speed that is equal to or less than 1/10 of the first rotation speed.

It is preferred, in the optical disk device, that the second laser power be equal to or greater than five times and equal to or less than ten times the first laser power. According to this configuration, the recordable mark can be written onto the optical disk using the second laser power that is equal to or greater than five times and equal to or less than ten times the first laser power.

It is also preferred that the optical disk device further have a tracking controller for performing tracking control on the optical pickup, wherein the tracking controller performs the tracking control using a phase difference detection method. According to this configuration, the tracking control can be performed using a phase difference detection method.

It is preferred, in the optical disk device, that a length of an emission section in which the laser beam is radiated with the second laser power be equal to or greater than ten times a shortest pit length of the concave-convex pits.

According to this configuration, the length of the emission section in which the laser beam is radiated with the second laser power is equal to or greater than ten times the shortest pit length of the concave-convex pits. Therefore, the recordable mark can be clearly distinguished from the concave-convex pits in the RF signal.

It is preferred, in the optical disk device, that the reference position detector demodulate the RF signal by using at least a PLL circuit, and, when radiating the laser beam with the second laser power, put a frequency comparison function or phase comparison function of the PLL circuit on hold.

According to this configuration, the RF signal is demodulated using at least the PLL circuit, and, when radiating the laser beam with the second laser power, the frequency comparison function or phase comparison function of the PLL circuit is put on hold. Therefore, it becomes difficult for the frequency comparison function or phase comparison function of the PLL circuit to respond to an optical pickup output signal obtained from the second laser power, whereby the RF signal can be demodulated properly.

It is preferred that the optical disk device further have a tracking controller for performing tracking control on the optical pickup, wherein, when radiating the laser beam with the second laser power, the tracking controller puts the tracking control on hold.

According to this configuration, when radiating the laser beam with the second laser power, the tracking controller puts the tracking control on hold. Therefore, it becomes difficult for the tracking control to respond to the optical pickup output signal obtained from the second laser power, whereby the tracking control can be performed properly.

It is preferred, in the optical disk device, that the concave-convex pits include synchronization codes, that the length of the emission section in which the laser beam is radiated with the second laser power be equal to or less than a length corresponding to one frame, and that an interval between the emission section and a subsequent emission section be equal to or longer than a length corresponding to three frames, when a distance between the synchronization codes is equal to the length corresponding to one frame.

According to this configuration, when the distance between the synchronization codes is equal to the length corresponding to one frame, the length of the emission section in which the laser beam is radiated with the second laser power is equal to or less than the length corresponding to one frame, and the interval between the emission section and the subsequent emission section is equal to or longer than the length corresponding to three frames. Thus, the tracking control can be put on hold in the emission section and recovered in the section corresponding to the length of at least three frames between adjacent recordable marks.

It is preferred, in the optical disk device, that the concave-convex pits include synchronization codes, and that when a distance between the synchronization codes is equal to a length corresponding to one frame, the length of the emission section in which the laser beam is radiated with the second laser power be equal to the integral multiple of a frame interval in the concave-convex pits.

According to this configuration, when the distance between the synchronization codes is equal to the length corresponding to one frame, the length of the emission section in which the laser beam is radiated with the second laser power is equal to the integral multiple of the frame interval in the concave-convex pits. Therefore, the recordable mark can be recorded by controlling a laser power with low frequency band. Because a fast and highly precise laser drive circuit that is used in a recording optical disk is not required, an inexpensive optical disk device can be configured.

It is preferred, in the optical disk device, that the main information recorded on the optical disk by the concave-convex pits includes address information indicating a physical position within the optical disk, and that the emission timing generation unit generate the emission timing such that laser beam is radiated with the second laser power outside an area in which the address information is recorded.

According to this configuration, the emission timing is generated such that laser beam is radiated with the second laser power outside the area in which the address information are recorded. Therefore, even when forming a plurality of recordable marks, the loser power is not switched to the second laser power in the area in which the address information are recorded. Thus, servo control and demodulation process can be performed in the area, and the address information can be detected properly.

It is preferred, in the optical disk device, that the main information recorded on the optical disk by the concave-convex pits be configured in units of error correction blocks in which error correction information is added to a certain unit of user data, and that the recordable mark recording controller control, in units of the error correction blocks, the emission section in which the laser beam is emitted with the second laser power generated by the emission timing generation unit.

According to this configuration, the main information that are recorded on the optical disk by the concave-convex pits are configured in units of error correction blocks in which the error correction information are added to a certain unit of user data. In units of the error correction blocks, the emission section for emitting light with the second laser power is controlled. Therefore, the starting point and ending point in the process of recording the recordable mark can be managed relatively easily.

It is preferred, in the optical disk device, that a length of the emission section in which the light beam is emitted with the second laser power generated by the emission timing generation unit be equal to the integral multiple of a unit length of the error correction blocks.

According to this configuration, the length of the emission section in which light is emitted with the second laser power generated by the emission timing generation unit is equal to the integral multiple of the unit length of the error correction blocks. Therefore, the starting point and ending point in the process of recording the recordable mark can be managed relatively easily.

It is preferred that the optical disk device further have a tracking controller for performing tracking control on the optical pickup, wherein the tracking controller performs the tracking control in the emission section in which the laser beam is emitted with the second laser power. According to this configuration, the tracking control can be performed in the section in which light is emitted with the second laser power.

It is preferred, in the optical disk device, that the emission timing generation unit generate a plurality of emission timing at which the laser beam is emitted with second laser power at regular intervals, within the error correction blocks.

According to this configuration, a plurality of emission timing at which the laser beam is emitted with second laser power at regular intervals is generated within the error correction blocks. Therefore, the starting point and ending point in the process of recording the recordable mark can be managed relatively easily.

It is preferred, in the optical disk device, that the emission timing generation unit generate random numbers and, based on the generated random numbers, randomly change a cycle of the emission timing at which the laser beam is emitted with the second laser power.

According to this configuration, random numbers are generated, and, based on the generated random numbers, the cycle of the emission timing at which the laser beam is emitted with the second laser power is changed randomly. Therefore, the recordable mark can be recorded with a plurality of recording patterns so that the recordable mark cannot be duplicated easily.

It is preferred, in the optical disk device, that the emission timing generation unit generate either one of first emission timing and second emission timing that are determined in advance so as not to overlap with each other on the optical disk, and that the recordable mark recording controller instruct the emission timing generation unit to select either the first emission timing or the second emission timing.

According to this configuration, either one of the first emission timing and the second emission timing that are determined previously so as not to overlap with each other on the optical disk is generated, and the recordable mark recording controller instructs the emission timing generation unit to select either the first emission timing or the second emission timing. Because the recordable mark recording controller instructs the emission timing generation unit to select either the predetermined first emission timing or the predetermined second emission timing so that the first emission timing and the second emission timing do not overlap with each other on the optical disk, a plurality of types of information can be written using the recordable mark.

It is preferred, in the optical disk device, that the reflectance ratio change amount detector detect a reflectance ratio change amount in the predetermined first emission timing and a reflectance ratio change amount in the second emission timing, and detect a binary datum that corresponds to a value "0" when the reflectance ratio change amount is detected in the first emission timing, and that corresponds to a value "1" when the reflectance ratio change amount is detected in the second emission timing.

According to this configuration, the reflectance ratio change amount detector detects the reflectance ratio change amount in the predetermined first emission timing and the reflectance ratio change amount in the second emission timing, and detects a binary datum corresponding to the value "0" when the reflectance ratio change amount is detected in the first emission timing, and corresponding to the value "1" when the reflectance ratio change amount is detected in the second emission timing. Therefore, a plurality of types of information can be written using the recordable mark.

It is preferred, in the optical disk device, that the reflectance change amount detector measure an amplitude average value of the RF signal and detect the reflectance ratio change amount by monitoring a fluctuation of the measured amplitude average value.

According to this configuration, the amplitude average value of the RF signal is measured, the reflectance ratio change amount is detected by monitoring a fluctuation of the measured amplitude average value. Therefore, the presence/absence of the recordable mark can be detected by the detection of the reflectance ratio change amount.

It is preferred, in the optical disk device, that the reference position detector detect a pit length of the concave-convex pits, and that the reflectance ratio change amount detector detect only the reflectance ratio change amount in a center of the concave-convex pits in which the detected pit length is equal to or longer than a predetermined length.

According to this configuration, the pit length of the concave-convex pits is detected, and only the reflectance ratio change amount at the center of the concave-convex pits is detected, the concave-convex pits having the detected pit length of equal to or longer than a certain length. Therefore, the occurrence of errors during the calculation of the amplitude average value, which is caused by the random arrangement of long and short pits in the concave-convex pits, can be reduced.

It is preferred, in the optical disk device, that the reflectance ratio change amount detector detect an integral value of an RF signal within the emission section in which the laser beam is radiated with the second laser power, and an integral value of an RF signal within a section that is outside and that has the same length as the emission section in which the laser beam is radiated with the second laser power, and then detect the reflectance ratio change amount by obtaining a difference between the two detected integral values.

According to this configuration, the reflectance ratio change amount detector detects the integral value of an RF signal within the emission section in which the laser beam is radiated with the second laser power, and the integral value of an RF signal within a section that is outside, and has the same length as, the emission section in which the laser beam is radiated with the second laser power, and then detects the reflectance ratio change amount by obtaining the difference between the two detected integral values. Therefore, the presence/absence of the recordable mark can be detected by the detection of the reflectance ratio change amount.

It is preferred, in the optical disk device, that the emission timing generation unit generate an emission timing at which the laser beam is emitted with the second laser power, in synchronization with a channel clock, and that the length of the emission section in which the laser beam is emitted with the second laser power be equal to or greater than ten times the shortest pit length of the concave-convex pits.

According to this configuration, the emission timing at which the laser beam is emitted with the second laser power is generated in synchronization with the channel clock, and the emission section in which the laser beam is emitted with the second laser power is equal to or greater than ten times the shortest pit length of the concave-convex pits. Therefore, because the emission timing is generated so as to record a plurality of recordable marks within one frame, the amount of information on the recorded recordable marks can be increased.

It is preferred that the optical disk device further have a shift controller, which, in the emission timing at which the laser beam is emitted with the second laser power generated by the emission timing generation unit, shifts the laser beam output by the optical pickup, from a center of the concave-convex pits in a radial direction of the optical disk by a predetermined distance in an inner circumferential direction or outer circumferential direction.

According to this configuration, in the emission timing generated at which the laser beam is emitted with the second laser power, the laser beam output by the optical pickup is shifted from the center of the concave-convex pits in the radial direction of the optical disk by a predetermined distance in the inner circumferential direction or outer circumferential direction.

Therefore, because the recordable mark is shifted from the center of the concave-convex pits in the radial direction of the optical disk by a predetermined distance in the inner circumferential direction or outer circumferential direction, the amount of information that can be recorded by the recordable mark can be increased.

It is preferred, in the optical disk device, that the reflectance ratio change amount detector detect that distributions of the reflected light from the recordable mark are asymmetric with respect to the center of the concave-convex pits in the radial direction of the optical disk, measure an amplitude average value of the RF signal of the asymmetric reflected light, and detect the reflectance ratio change amount by monitoring a fluctuation of the measured amplitude average value.

According to this configuration, the reflectance ratio change amount detector detects that the distributions of the reflected light from the recordable mark are asymmetric with respect to the center of the concave-convex pits in the radial direction of the optical disk, measures the amplitude average value of the RF signal of the asymmetric reflected light, and detects the reflectance ratio change amount by monitoring a fluctuation of the measured amplitude average value.

Therefore, it is possible to detect the recordable mark that is written by being shifted from the center of the concave-convex pits in the radial direction of the optical disk by a predetermined distance in the inner circumferential direction or outer circumferential direction, and the amount of information that can be recorded by the recordable mark can be increased.

It is preferred, in the optical disk device, that the laser power controller perform control such that the second laser power is changed to a plurality of values in accordance with a predetermined pattern or a random pattern determined by a random number series, in the emission timing at which the laser beam is emitted with the second laser power generated by the emission timing generation unit.

According to this configuration, the laser power controller performs control such that the second laser power is changed to a plurality of values in accordance with a predetermined pattern or a random pattern determined by a random number series, in the emission timing at which the laser beam is emitted with the second laser power. Therefore, the record-able mark that includes a plurality of region of different reflectance ratios can be written.

It is preferred, in the optical disk device, that in the emission timing at which the laser beam is emitted with the second laser power generated by the emission timing generation unit, the reflectance ratio change amount detector compare a difference value between a waveform of an RF signal obtained prior to the radiation of the laser beam and a waveform of an RF signal obtained after the radiation of the laser beam, with the predetermined pattern or the random pattern determined by the random number series, determine that the recordable mark is properly recorded when the difference value matches the pattern, and determine that the recordable mark is not properly recorded when the difference value does not match the pattern.

According to this configuration, in the emission timing at which the laser beam is emitted with the second laser power, the difference value between a waveform of an RF signal obtained prior to the radiation of the laser beam and a waveform of an RF signal obtained after the radiation of the laser beam is compared with the predetermined pattern or the random pattern determined by the random number series. When the difference value matches the pattern, it is determined that the recordable mark is recorded properly. When the difference value does not match the pattern, it is determined that the recordable mark is not recorded properly. Therefore, the detection of the recordable mark can be utilized as key authentication.

It is preferred, in the optical disk device, that the length of the emission section in which the laser beam is radiated with the second laser power be determined by the random number series.

According to this configuration, the length of the emission section in which the laser beam is radiated with the second laser power is determined by the random number series. Because the position for recording the recordable mark changes randomly, the position in which the recordable mark is recorded needs to be obtained accurately based on the random numbers in order to detect the detection timing, and the recordable mark can be recorded using a plurality of recording patterns by appropriately replacing the random number series.

An integrated circuit according to another aspect of the present invention is an integrated circuit provided in an optical disk device for writing a recordable mark onto an optical disk having main information recorded thereon by concave-convex pits, by changing a reflectance ratio of a reflective film formed on the concave-convex pits, the integrated circuit having: an RF signal processing circuit that acquires an RF signal based on an output from an optical pickup; a reference position detecting circuit that demodulates the RF signal and detects a reference position signal; a rotation speed control circuit that switches a rotation speed of the optical disk between at least two rotation speeds; an emission timing generating circuit that generates, according to the reference position signal, an emission timing at which a laser beam is radiated from the optical pickup at a predetermined position; a laser power control circuit that increases a laser power of the laser beam that is radiated from the optical pickup at the emission timing; a reflectance ratio change amount detecting circuit that detects, from the RF signal, an amount of change in a reflectance ratio of reflected light reflected from the optical disk; a concave-convex pit reproduction control circuit that sets a first rotation speed in the rotation speed control circuit and a first laser power in the laser power control circuit when reproducing the concave-convex pits formed on the optical disk; and a recordable mark recording control circuit that, when writing the recordable mark onto the optical disk, sets in the rotation speed control circuit a second rotation speed that is slower than the first rotation speed and a lowest rotation speed at which the concave-convex pits can be reproduced, and sets a second laser power greater than the first laser power in the laser power control circuit according to the emission timing.

According to this configuration, the RF signal is acquired based on an output from the optical pickup. The RF signal is demodulated, and the reference position signal is detected. The rotation speed control circuit switches the rotation speed of the optical disk between at least two rotation speeds. According to the reference position signal, the emission timing generating circuit generates the emission timing at which the laser beam is radiated from the optical pickup at a predetermined position. The laser power control circuit increases the laser power of the laser beam radiated from the optical pickup at the emission timing. The reflectance ratio change amount detecting circuit detects, from the RF signal, the amount of change in the reflectance ratio of the reflected light reflected from the optical disk. When reproducing the concave-convex pits formed on the optical disk, the first rotation speed is set in the rotation speed control circuit, and the first laser power is set in the laser power control circuit. When writing the recordable mark onto the optical disk, the second rotation speed, which is slower than the first rotation speed and the lowest rotation speed at which the concave-convex pits can be reproduced, is set in the rotation speed control circuit. According to the emission timing, the second laser power greater than the first laser power is set in the laser power control circuit.

Therefore, the recordable mark can be written onto the optical disk having the main information recorded thereon by the concave-convex pits, by changing the reflectance ratio of the reflective film formed on the concave-convex pits, by using a relatively inexpensive low-power laser light source, instead of using an industrial special device or high-power laser light source.

It is preferred that the integrated circuit further have a recordable mark detection control circuit, which, when detecting the recordable mark formed on the optical disk, performs control to detect the recordable mark based on the reflectance ratio change amount that is detected by the reflectance ratio change amount detecting circuit.

According to this configuration, when detecting the recordable mark formed on the optical disk, the recordable mark can be detected based on the amount of change in the reflectance ratio that is detected by the reflectance ratio change amount detecting circuit.

An optical disk method according to another aspect of the present invention is an optical disk control method for writing a recordable mark onto an optical disk having main information recorded thereon by concave-convex pits, by changing a reflectance ratio of a reflective film formed on the concave-convex pits, the optical disk control method having: an RF signal processing step of acquiring an RF signal based on an output from an optical pickup; a reference position detection step of demodulating the RF signal and detecting a reference position signal; a rotation speed controlling step of switching a rotation speed of the optical disk between at least two rotation speeds; an emission timing generation step of generating, according to the reference position signal, an emission timing at which a laser beam is radiated from the optical pickup at a predetermined position; a laser power controlling step of increasing a laser power of the laser beam that is radiated from the optical pickup at the emission timing; a reflectance ratio change amount detection step of detecting, from the RF signal, an amount of change in a reflectance ratio of reflected light reflected from the optical disk; a concave-convex pit reproduction controlling step of setting a first rotation speed in the rotation speed controlling step and a first laser power in the laser power controlling step when reproducing the concave-convex pits formed on the optical disk; and a recordable mark record controlling step of, when writing the recordable mark onto the optical disk, setting in the rotation speed controlling step a second rotation speed that is slower than the first rotation speed and a lowest rotation speed at which the concave-convex pits can be reproduced, and setting a second laser power greater than the first laser power in the laser power controlling step according to the emission timing.

According to this configuration, the RF signal is acquired based on an output from the optical pickup. The RF signal is demodulated, and the reference position signal is detected. In the rotation speed controlling step, the rotation speed of the optical disk is switched between at least two rotation speeds. According to the reference position signal, in the emission timing generation step, the emission timing at which the laser beam is radiated from the optical pickup at a predetermined position is generated. In the laser power controlling step, the laser power of the laser beam radiated from the optical pickup at the emission timing is increased. In the reflectance ratio change amount detection step, the amount of change in the reflectance ratio of the reflected light reflected from the optical disk is detected from the RF signal. When reproducing the concave-convex pits formed on the optical disk, the first rotation speed is set in the rotation speed controlling step, and the first laser power is set in the laser power controlling step. When writing the recordable mark onto the optical disk, the second rotation speed, which is slower than the first rotation speed and the lowest rotation speed at which the concave-convex pits can be reproduced, is set in the rotation speed controlling step. According to the emission timing, the second laser power greater than the first laser power is set in the laser power controlling step.

Therefore, the recordable mark can be written onto the optical disk having the main information recorded thereon by the concave-convex pits, by changing the reflectance ratio of the reflective film formed on the concave-convex pits, by using a relatively inexpensive low-power laser light source, instead of using an industrial special device or high-power laser light source.

It is preferred that the optical disk control method further have a recordable mark detection controlling step of, when detecting the recordable mark formed on the ptical disk, performing control to detect the recordable mark based on the amount of change in the reflectance ratio that is detected in the reflectance ratio change amount detection step.

According to this configuration, when detecting the recordable mark formed on the optical disk, the recordable mark can be detected based on the amount of change in the reflectance ratio that is detected in the reflectance ratio change amount detection step.

The specific embodiments or examples provided in the chapter, Best Modes for Carrying Out the Invention, are merely to clarify the technical contents of the present invention and are not to be interpreted narrowly in such embodiments only. Such embodiments or examples can be implemented in various different ways without departing from the spirit of the present invention and the scope of the appended claims.

INDUSTRIAL APPLICABILITY

The optical disk device, optical disk control method and integrated circuit according to the present invention can be utilized in an optical disk device, optical disk control method and integrated circuit, which are capable of writing a recordable mark onto an optical disk having main information recorded thereon by concave-convex pits, by changing the reflectance ratio of a reflective film formed on the concave-convex pits, by using a relatively inexpensive low-power laser light source, instead of using an industrial special device or a high-power laser light source.

The invention claimed is:

1. An optical disk device for writing a recordable mark onto an optical disk having main information recorded thereon by concave-convex pits, the recordable mark being written onto the optical disk by changing a reflectance ratio of a reflective film formed on the concave-convex pits,
the optical disk device comprising:
an optical pickup;
an RF signal processor that acquires an RF signal based on an output from the optical pickup;
a reference position detector that demodulates the RF signal and detects a reference position signal;
a rotation speed controller that switches a rotation speed of the optical disk between at least two rotation speeds;
an emission timing generation unit that generates, according to the reference position signal, an emission timing at which a laser beam is radiated from the optical pickup at a predetermined position;
a laser power controller that increases a laser power of the laser beam that is radiated from the optical pickup at the emission timing;
a reflectance ratio change amount detector that detects, from the RF signal, an amount of change in a reflectance ratio of reflected light reflected from the optical disk;
a concave-convex pit reproduction controller that sets a first rotation speed in the rotation speed controller and a first laser power in the laser power controller when reproducing the concave-convex pits formed on the optical disk, the concave-convex pits recording the main information on the optical disk; and
a recordable mark recording controller that, when writing the recordable mark onto the optical disk, changes the reflectance ratio of the reflective film formed on the concave-convex pits by setting (i) the rotation speed controller, a second rotation speed that is slower than the first rotation speed and a lowest rotation speed at which the concave-convex pits can be reproduced and (ii) a second laser power greater than the first laser power in the laser power controller according to the emission timing.

2. The optical disk device according to claim 1, further comprising a recordable mark detection controller, which, when detecting the recordable mark formed on the optical disk, performs control to detect the recordable mark based on the amount of change in the reflectance ratio that is detected by the reflectance ratio change amount detector.

3. The optical disk device according to claim 1, wherein the second rotation speed is equal to or less than ½ the lowest rotation speed.

4. The optical disk device according to claim 1, wherein the second rotation speed is equal to or less than 1/10 of the first rotation speed.

5. The optical disk device according to claim 1, wherein the second laser power is equal to or greater than five times and equal to or less than ten times the first laser power.

6. The optical disk device according to claim 1, further comprising a tracking controller for performing tracking control on the optical pickup, wherein the tracking controller performs the tracking control using a phase difference detection method.

7. The optical disk device according to claim 1, wherein a length of an emission section in which the laser beam is radiated with the second laser power is equal to or greater than ten times a shortest pit length of the concave-convex pits.

8. The optical disk device according to claim 1, wherein the reference position detector demodulates the RF signal by using at least a PLL circuit, and, when radiating the laser beam with the second laser power, puts a frequency comparison function or phase comparison function of the PLL circuit on hold.

9. The optical disk device according to claim 1, further comprising a tracking controller for performing tracking control on the optical pickup, wherein
when radiating the laser beam with the second laser power, the tracking controller puts the tracking control on hold.

10. The optical disk device according to claim 1, wherein the concave-convex pits include synchronization codes, the length of the emission section in which the laser beam is radiated with the second laser power is equal to or less than a length corresponding to one frame, and an interval between the emission section and a subsequent emission section is equal to or longer than a length corresponding to three frames, when a distance between the synchronization codes is equal to the length corresponding to one frame.

11. The optical disk device according to claim 1, wherein the concave-convex pits include synchronization codes, and when a distance between the synchronization codes is equal to a length corresponding to one frame, the length of the emission section in which the laser beam is radiated with the second laser power is equal to an integral multiple of a frame interval in the concave-convex pits.

12. The optical disk device according to claim 1, wherein the main information recorded on the optical disk by the concave-convex pits includes address information indicating a physical position within the optical disk, and
the emission timing generation unit generates the emission timing such that laser beam is radiated with the second laser power outside an area in which the address information is recorded.

13. The optical disk device according to claim 1, wherein the main information recorded on the optical disk by the concave-convex pits are configured in units of error correction blocks in which error correction information is added to a certain unit of user data, and
the recordable mark recording controller controls, in units of the error correction blocks, the emission section in which the laser beam is emitted with the second laser power generated by the emission timing generation unit.

14. The optical disk device according to claim 13, wherein a length of the emission section in which the light beam is emitted with the second laser power generated by the emission timing generation unit is equal to an integral multiple of a unit length of the error correction blocks.

15. The optical disk device according to claim 1, further comprising a tracking controller for performing tracking control on the optical pickup, wherein
the tracking controller performs the tracking control in the emission section in which the laser beam is emitted with the second laser power.

16. The optical disk device according to claim 13, wherein the emission timing generation unit generates a plurality of emission timing at which the laser beam is emitted with second laser power at regular intervals, within the error correction blocks.

17. The optical disk device according to claim 1, wherein the emission timing generation unit generates random numbers and, based on the generated random numbers, randomly changes a cycle of the emission timing at which the laser beam is emitted with the second laser power.

18. The optical disk device according to claim 1, wherein the emission timing generation unit generates either first emission timing or second emission timing that are determined in advance so as not to overlap with each other on the optical disk, and
the recordable mark recording controller instructs the emission timing generation unit to select either the first emission timing or the second emission timing.

19. The optical disk device according to claim 18, wherein the reflectance ratio change amount detector detects a reflectance ratio change amount in the predetermined first emission timing and a reflectance ratio change amount in the second emission timing, and detects a binary datum that corresponds to a value "0" when the reflectance ratio change amount is detected in the first emission timing, and that corresponds to a value "1" when the reflectance ratio change amount is detected in the second emission timing.

20. The optical disk device according to claim 1, wherein the reflectance change amount detector measures an amplitude average value of the RF signal and detects the reflectance ratio change amount by monitoring a fluctuation of the measured amplitude average value.

21. The optical disk device according to claim 20, wherein the reference position detector detects a pit length of the concave-convex pits, and the reflectance ratio change amount detector detect only the reflectance ratio change amount in a center of the concave-convex pits in which the detected pit length is equal to or longer than a predetermined length.

22. The optical disk device according to claim 1, wherein the reflectance ratio change amount detector detects an integral value of an RF signal within the emission section in which the laser beam is radiated with the second laser power, and an integral value of an RF signal within a section that is outside and that has the same length as the emission section in which the laser beam is radiated with the second laser power, and then detects the reflectance ratio change amount by obtaining a difference between the two detected integral values.

23. The optical disk device according to claim 1, wherein the emission timing generation unit generates an emission timing at which the laser beam is emitted with the second laser power, in synchronization with a channel clock, and
the length of the emission section in which the laser beam is emitted with the second laser power is equal to or greater than ten times the shortest pit length of the concave-convex pits.

24. The optical disk device according to claim 1, further comprising a shift controller, which, in the emission timing at which the laser beam is emitted with the second laser power generated by the emission timing generation unit, shifts the laser beam output by the optical pickup, from a center of the concave-convex pits in a radial direction of the optical disk by a predetermined distance in an inner circumferential direction or outer circumferential direction.

25. The optical disk device according to claim 24, wherein the reflectance ratio change amount detector detects that distributions of the reflected light from the recordable mark are asymmetric with respect to the center of the concave-convex pits in the radial direction of the optical disk, measures an amplitude average value of the RF signal of the asymmetric reflected light, and detects the reflectance ratio change amount by monitoring a fluctuation of the measured amplitude average value.

26. The optical disk device according to claim 1, wherein the laser power controller perform control such that the second laser power is changed to a plurality of values in accordance with a predetermined pattern or a random pattern determined by a random number series, in the emission timing at which the laser beam is emitted with the second laser power generated by the emission timing generation unit.

27. The optical disk device according to claim 26, wherein, in the emission timing at which the laser beam is emitted with the laser power generated by the emission timing generation unit, the reflectance ratio change amount detector compares a difference value between a waveform of an RF signal obtained prior to the radiation of the laser beam and a waveform of an RF signal obtained after the radiation of the laser beam, with the predetermined pattern or the random pattern determined by the random number series, determines that the recordable mark is properly recorded when the difference value matches the pattern, and determines that the recordable mark is not properly recorded when the difference value does not match the pattern.

28. The optical disk device according to claim 1, wherein the length of the emission section in which the laser beam is radiated with the second laser power is determined by the random number series.

29. An integrated circuit provided in an optical disk device for writing a recordable mark onto an optical disk having main information recorded thereon by concave-convex pits, the recordable mark being written onto the optical disk by changing a reflectance ratio of a reflective film formed on the concave-convex pits,
the integrated circuit comprising:
an RF signal processing circuit that acquires an RF signal based on an output from an optical pickup;
a reference position detecting circuit that demodulates the RF signal and detects a reference position signal;
a rotation speed control circuit that switches a rotation speed of the optical disk between at least two rotation speeds;
an emission timing generating circuit that generates, according to the reference position signal, an emission timing at which a laser beam is radiated from the optical pickup at a predetermined position;
a laser power control circuit that increases a laser power of the laser beam that is radiated from the optical pickup at the emission timing;
a reflectance ratio change amount detecting circuit that detects, from the RF signal, an amount of change in a reflectance ratio of reflected light reflected from the optical disk;
a concave-convex pit reproduction control circuit that sets a first rotation speed in the rotation speed control circuit and a first laser power in the laser power control circuit when reproducing the concave-convex pits formed on the optical disk, the concave-convex pits recording the main information on the optical disk; and
a recordable mark recording control circuit that, when writing the recordable mark onto the optical disk, changes the reflectance ratio of the reflective film formed on the concave-convex pits by setting (i) the rotation speed control circuit, a second rotation speed that is slower than the first rotation speed and a lowest rotation speed at which the concave-convex pits can be reproduced and (ii) a second laser power greater than the first laser power in the laser power control circuit according to the emission timing.

30. The integrated circuit according to claim 29, further comprising a recordable mark detection control circuit, which, when detecting the recordable mark formed on the optical disk, performs control to detect the recordable mark based on the reflectance ratio change amount that is detected by the reflectance ratio change amount detecting circuit.

31. An optical disk control method for writing a recordable mark onto an optical disk having main information recorded thereon by concave-convex pits, the recordable mark being written onto the optical disk by changing a reflectance ratio of a reflective film formed on the concave-convex pits, the optical disk control method comprising:
an RF signal processing step of acquiring an RF signal based on an output from an optical pickup;
a reference position detection step of demodulating the RF signal and detecting a reference position signal;
a rotation speed controlling step of switching a rotation speed of the optical disk between at least two rotation speeds;
an emission timing generation step of generating, according to the reference position signal, an emission timing at which a laser beam is radiated from the optical pickup at a predetermined position;
a laser power controlling step of increasing a laser power of the laser beam that is radiated from the optical pickup at the emission timing;
a reflectance ratio change amount detection step of detecting, from the RF signal, an amount of change in a reflectance ratio of reflected light reflected from the optical disk;
a concave-convex pit reproduction controlling step of setting a first rotation speed in the rotation speed controlling step and a first laser power in the laser power controlling step when reproducing the concave-convex pits formed on the optical disk, the concave-convex pits recording the main information on the optical disk; and
a recordable mark record controlling step of, when writing the recordable mark onto the optical disk, changes the reflectance ratio of the reflective film formed on the concave-convex pits by setting (i) the rotation speed controlling step, a second rotation speed that is slower than the first rotation speed and a lowest rotation speed at which the concave-convex pits can be reproduced and (ii) a second laser power greater than the first laser power in the laser power controlling step according to the emission timing.

32. The optical disk control method according to claim 31, further comprising a recordable mark detection controlling step of, when detecting the recordable mark formed on the optical disk, performing control to detect the recordable mark based on the amount of change in the reflectance ratio that is detected in the reflectance ratio change amount detection step.

* * * * *